United States Patent
Snider et al.

(10) Patent No.: US 11,035,248 B1
(45) Date of Patent: Jun. 15, 2021

(54) UNITARY BODY TURBINE SHROUDS INCLUDING SHOT PEEN SCREENS INTEGRALLY FORMED THEREIN AND TURBINE SYSTEMS THEREOF

(71) Applicant: General Electric Company, Schenectady, NY (US)

(72) Inventors: Zachary John Snider, Simpsonville, SC (US); Evan John Dozier, Greenville, SC (US); Claire Fridtjof Lang, Greenville, SC (US)

(73) Assignee: General Electric Company, Schenectady, NY (US)

( * ) Notice: Subject to any disclaimer, the term of this patent is extended or adjusted under 35 U.S.C. 154(b) by 51 days.

(21) Appl. No.: 16/693,856

(22) Filed: Nov. 25, 2019

(51) Int. Cl.
| | |
|---|---|
| *F01D 11/08* | (2006.01) |
| *F01D 25/12* | (2006.01) |
| *B24C 1/10* | (2006.01) |
| *B24C 3/32* | (2006.01) |

(52) U.S. Cl.
CPC .............. *F01D 25/12* (2013.01); *F01D 11/08* (2013.01); *B24C 1/10* (2013.01); *B24C 3/32* (2013.01); *F05D 2240/11* (2013.01); *F05D 2260/201* (2013.01); *F05D 2260/22141* (2013.01)

(58) Field of Classification Search
CPC . F01D 11/08; F01D 25/12; B24C 1/10; B24C 3/32; F05D 2240/11; F05D 2260/201; F05D 2260/22141
See application file for complete search history.

(56) References Cited

U.S. PATENT DOCUMENTS

| | | | |
|---|---|---|---|
| 7,052,233 B2 | 5/2006 | Fried et al. | |
| 7,665,962 B1 | 2/2010 | Liang | |
| 9,611,754 B2* | 4/2017 | Taylor | ..................... F01D 25/12 |
| 9,689,276 B2* | 6/2017 | Lefebvre | ................. F01D 11/24 |
| 2007/0048122 A1 | 3/2007 | Van Suetendael, IV et al. | |
| 2009/0214329 A1 | 8/2009 | Joe et al. | |
| 2013/0192257 A1 | 8/2013 | Horine et al. | |
| 2017/0368665 A1 | 12/2017 | Feick et al. | |
| 2018/0238188 A1* | 8/2018 | Shoemaker | ........... F01D 25/005 |

(Continued)

FOREIGN PATENT DOCUMENTS

EP 0893577 B1 1/1999

*Primary Examiner* — Igor Kershteyn
(74) *Attorney, Agent, or Firm* — Charlotte Wilson; Hoffman Warnick LLC

(57) ABSTRACT

Turbine shrouds including shot peen screens integrally formed therein. The shroud may include a unitary body having a support portion coupled directly to a turbine casing of the turbine system, an intermediate portion integral with and extending away from the support portion, and a seal portion integral with the intermediate portion, opposite the support portion. The unitary body may also include an inlet opening(s) formed in the support portion, a plenum(s) in fluid communication with the inlet opening(s), and a cooling passage extending through the seal portion and in fluid communication with the plenum(s). Additionally, the unitary body may include a shot peen screen(s) positioned within the plenum(s) and extending within the intermediate portion. The shot peen screen(s) may include a plurality of voids formed therethrough and may prevents shot from passing through the shot peen screen(s) when performing a shot peening process on the unitary body.

20 Claims, 13 Drawing Sheets

(56) References Cited

U.S. PATENT DOCUMENTS

| 2020/0025026 A1* | 1/2020 | Packer | F01D 25/246 |
| 2020/0248557 A1* | 8/2020 | Snider | F01D 5/143 |
| 2020/0248558 A1* | 8/2020 | Snider | F01D 11/122 |
| 2020/0248559 A1* | 8/2020 | Raghavan | F01D 5/143 |

* cited by examiner

UNITARY BODY TURBINE SHROUDS INCLUDING SHOT PEEN SCREENS INTEGRALLY FORMED THEREIN AND TURBINE SYSTEMS THEREOF

BACKGROUND

The disclosure relates generally to a turbine system component and a turbine system thereof, and more particularly, to a unitary body turbine shrouds for turbine systems that include shot peen screens integrally formed therein.

Conventional turbomachines, such as gas turbine systems, generate power for electric generators. In general, gas turbine systems generate power by passing a fluid (e.g., hot gas) through a turbine component of the gas turbine system. More specifically, inlet air may be drawn into a compressor to be compressed. Once compressed, the inlet air is mixed with fuel to form a combustion product, which may be reacted by a combustor of the gas turbine system to form the operational fluid (e.g., hot gas) of the gas turbine system. The fluid may then flow through a fluid flow path for rotating a plurality of rotating blades and rotor or shaft of the turbine component for generating the power. The fluid may be directed through the turbine component via the plurality of rotating blades and a plurality of stationary nozzles or vanes positioned between the rotating blades. As the plurality of rotating blades rotate the rotor of the gas turbine system, a generator coupled to the rotor may generate power from the rotation of the rotor.

To improve operational efficiencies, turbine components may include hot gas path components, such as turbine shrouds and/or nozzle bands, to further define the flow path for the operational fluid. Turbine shrouds, for example, may be positioned radially adjacent rotating blades of the turbine component and may direct the operational fluid within the turbine component and/or define the outer bounds of the flow path for the operational fluid. During operation, turbine shrouds may be exposed to high temperature operational fluids flowing through the turbine component. Over time and/or during exposure, the turbine shrouds may undergo undesirable thermal expansion. The thermal expansion of turbine shrouds may result in damage to the shrouds and/or may not allow the shrouds to maintain a seal within the turbine component. When the turbine shrouds become damaged or no longer form a satisfactory seal within the turbine component, the operational fluid may leak from the flow path, which in turn reduces the operational efficiency of the turbine component and the entire turbine system.

To minimize thermal expansion, turbine shrouds are typically cooled. Conventional processes for cooling turbine shrouds include impingement cooling. Impingement cooling utilizes holes or apertures formed through the turbine shroud to provide cooling air to various portions of the turbine shroud during operation. With advancement in additive manufacturing, shrouds may be additively manufactured to create intricate impingement cooling circuits therein, to improve cooling and/or further minimize thermal expansion. However, additively manufactured shrouds typically undergo additional or post-build processing to improve and/or increase the operational life of the shrouds. These post-build processes include, for example, shot peening, and or grit blasting the additively manufactured shroud.

However, by performing, for example, a shot peen process on the shroud, the risk of the shot being undesirably embedded, stuck, and/or trapped within the intricate geometries of the shroud increases. For example, the shot may be embedded or trapped within openings, conduits, and/or passages utilized in the impingement cooling of the shroud. These trapped shots obstruct or block the openings, conduits, and/or passages, and thus reduce the effect of impingement cooling within the shroud. While certain apertures or features of the shroud may be covered with plugs and/or tapes prior to performing the shot peen process, the plugs may become uncoupled during the shot peen process and may no longer prevent the shot(s) from entering the apertures or features. Additionally, while taping the aperture or feature may prevent the shot from undesirably entering the aperture or feature, it may also block and/or obstruct a surface that should receive the shot peen. Furthermore, plugging or taping each aperture or feature is very time consuming, and often requires adjustments through the shot peening process.

BRIEF DESCRIPTION

A first aspect of the disclosure provides a turbine shroud for a turbine system. The turbine shroud includes: a unitary body including: a support portion coupled directly to a turbine casing of the turbine system; an intermediate portion integral with and extending away from the support portion; a seal portion integral with the intermediate portion and opposite the support portion, the seal portion including a forward end, an aft end positioned opposite the forward end, and a hot gas path (HGP) surface extending between the forward end and the aft end; at least one inlet opening formed in the support portion; at least one plenum in fluid communication with the at least one inlet opening, the at least one plenum extending through the support portion and the intermediate portion; a cooling passage extending through the seal portion, between the forward end and the aft end of the seal portion, the cooling passage positioned between the at least one plenum and the HGP surface of the seal portion, wherein the cooling passage is in fluid communication with the at least one plenum; and at least one shot peen screen positioned within the at least one plenum and extending within the intermediate portion, the at least one shot peen screen including a plurality of voids formed therethrough, wherein the at least one shot peen screen prevents shot from passing through the at least one shot peen screen when performing a shot peening process on the unitary body.

A second aspect of the disclosure provides a turbine system including: a turbine casing; a rotor extending axially through the turbine casing; a plurality of turbine blades positioned circumferentially about and extending radially from the rotor; and a plurality of turbine shrouds directly coupled to the turbine casing and positioned radially between the turbine casing and a tip portion of the plurality of turbine blades, each of the plurality of turbine shrouds including: a unitary body including: a support portion coupled directly to a turbine casing of the turbine system; an intermediate portion integral with and extending away from the support portion; a seal portion integral with the intermediate portion and opposite the support portion, the seal portion including a forward end, an aft end positioned opposite the forward end, and a hot gas path (HGP) surface extending between the forward end and the aft end; at least one inlet opening formed in the support portion; at least one plenum in fluid communication with the at least one inlet opening, the at least one plenum extending through the support portion and the intermediate portion; a cooling passage extending through the seal portion, between the forward end and the aft end of the seal portion, the cooling passage positioned between the at least one plenum and the HGP surface of the seal portion, wherein the cooling passage is in fluid communication with the at least one plenum; and at least one shot peen screen positioned within the at least one plenum and extending within the intermediate portion, the at least one shot peen screen including a plurality of voids formed therethrough, wherein the at least one shot peen screen prevents shot from passing through the at least one shot peen screen when performing a shot peening process on the unitary body.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
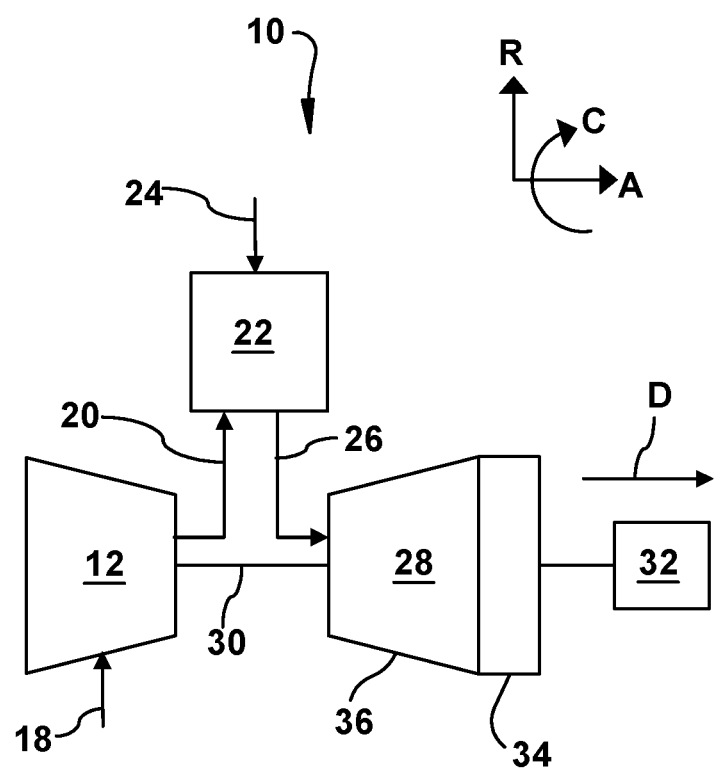
FIG. 1 shows a schematic diagram of a gas turbine system, according to embodiments of the disclosure.

As an initial matter, in order to clearly describe the current disclosure it will become necessary to select certain terminology when referring to and describing relevant machine components within the scope of this disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. Additionally, the terms "leading" and "trailing" may be used and/or understood as being similar in description as the terms "forward" and "aft," respectively. It is often required to describe parts that are at differing radial, axial and/or circumferential positions. The "A" axis represents an axial orientation. As used herein, the terms "axial" and/or "axially" refer to the relative position/direction of objects along axis A, which is substantially parallel with the axis of rotation of the turbine system (in particular, the rotor section). As further used herein, the terms "radial" and/or "radially" refer to the relative position/direction of objects along a direction "R" (see, FIGS. 1 and 2), which is substantially perpendicular with axis A and intersects axis A at only one location. Finally, the term "circumferential" refers to movement or position around axis A (e.g., direction "C").

As indicated above, the disclosure relates generally to a turbine system component and a turbine system thereof, and more particularly, to a unitary body turbine shrouds for turbine systems that include shot peen screens integrally formed therein.

These and other embodiments are discussed below with reference to FIGS. 1-13. However, those skilled in the art will readily appreciate that the detailed description given herein with respect to these Figures is for explanatory purposes only and should not be construed as limiting.

FIG. 1 shows a schematic view of an illustrative gas turbine system 10. Gas turbine system 10 may include a compressor 12. Compressor 12 compresses an incoming flow of air 18. Compressor 12 delivers a flow of compressed air 20 to a combustor 22. Combustor 22 mixes the flow of compressed air 20 with a pressurized flow of fuel 24 and ignites the mixture to create a flow of combustion gases 26. Although only a single combustor 22 is shown, gas turbine system 10 may include any number of combustors 22. The flow of combustion gases 26 is in turn delivered to a turbine 28, which typically includes a plurality of turbine blades including airfoils (see, FIG. 2) and stator vanes (see, FIG. 2). The flow of combustion gases 26 drives turbine 28, and more specifically the plurality of turbine blades of turbine 28, to produce mechanical work. The mechanical work produced in turbine 28 drives compressor 12 via a rotor 30 extending through turbine 28, and may be used to drive an external load 32, such as an electrical generator and/or the like.

Gas turbine system 10 may also include an exhaust frame 34. As shown in FIG. 1, exhaust frame 34 may be positioned adjacent to turbine 28 of gas turbine system 10. More specifically, exhaust frame 34 may be positioned adjacent to turbine 28 and may be positioned substantially downstream of turbine 28 and/or the flow of combustion gases 26 flowing from combustor 22 to turbine 28. As discussed herein, a portion (e.g., outer casing) of exhaust frame 34 may be coupled directly to an enclosure, a shell, or a casing 36 of turbine 28.

Subsequent to combustion gases 26 flowing through and driving turbine 28, combustion gases 26 may be exhausted, flow-through and/or discharged through exhaust frame 34 in a flow direction (D). In the non-limiting example shown in FIG. 1, combustion gases 26 may flow through exhaust frame 34 in the flow direction (D) and may be discharged from gas turbine system 10 (e.g., to the atmosphere). In another non-limiting example where gas turbine system 10 is part of a combined cycle power plant (e.g., including gas turbine system and a steam turbine system), combustion gases 26 may discharge from exhaust frame 34, and may flow in the flow direction (D) into a heat recovery steam generator of the combined cycle power plant.

Figure 2:
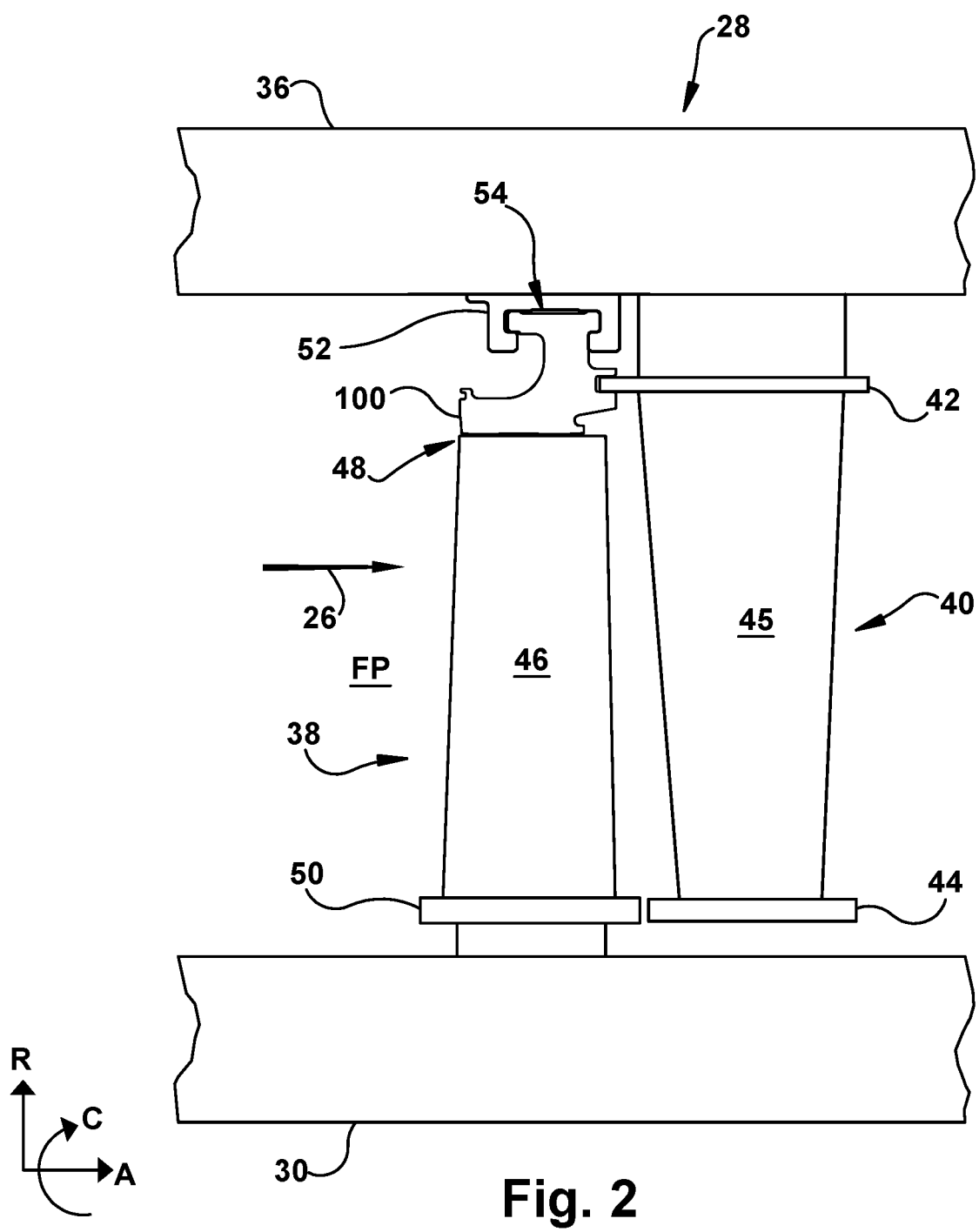
FIG. 2 shows a side view of a portion of a turbine of the gas turbine system of FIG. 1 including a turbine blade, a stator vane, a rotor, a turbine casing, and a turbine shroud, according to embodiments of the disclosure.

Turning to FIG. 2, a portion of turbine 28 is shown. Specifically, FIG. 2 shows a side view of a portion of turbine 28 including a stage of turbine blades 38 (one shown), and a stage of stator vanes 40 (one shown) positioned within casing 36 of turbine 28. As discussed herein, each stage (e.g., first stage, second stage (not shown), third stage (not shown)) of turbine blades 38 may include a plurality of turbine blades 38 that may be coupled to and positioned circumferentially around or about rotor 30 and may be driven by combustion gases 26 to rotate rotor 30. As show, the plurality of turbine blades 38 may also extend radially from rotor 30. Additionally, each stage (e.g., first stage, second stage (not shown), third stage (not shown)) of stator vanes 40 may include a plurality of stator vanes that may be coupled to and/or positioned circumferentially about casing 36 of turbine 28. In the non-limiting example shown in FIG. 2, stator vanes 40 may include a plurality of hot gas path (HGP) components including or formed as an outer platform 42, and an inner platform 44 positioned opposite outer platform 42. Stator vanes 40 of turbine 28 may also include an airfoil 45 positioned between outer platform 42 and inner platform 44. Outer platform 42 and inner platform 44 of stator vanes 40 may define a flow path (FP) for the combustion gases 26 flowing over stator vanes 40. As discussed herein, stator vanes 40 may be coupled to adjacent and/or surrounding turbine shrouds of turbine 28.

Each turbine blade 38 of turbine 28 may include an airfoil 46 extending radially from rotor 30 and positioned within the flow path (FP) of combustion gases 26 flowing through turbine 28. Each airfoil 46 may include a tip portion 48 positioned radially opposite rotor 30. Turbine blade 38 may also include a platform 50 positioned opposite tip portion 48 of airfoil 46. In a non-limiting example, platform 50 may partially define a flow path for combustion gases 26 for turbine blades 38. Turbine blades 38 and stator vanes 40 may also be positioned axially adjacent to one another within casing 36. In the non-limiting example shown in FIG. 2, stator vanes 40 may be positioned axially adjacent and downstream of turbine blades 38. Not all turbine blades 38, stator vanes 40 and/or all of rotor 30 of turbine 28 are shown for clarity. Additionally, although only a portion of a single stage of turbine blades 38 and stator vanes 40 of turbine 28 are shown in FIG. 2, turbine 28 may include a plurality of stages of turbine blades and stator vanes, positioned axially throughout casing 36 of turbine 28.

Turbine 28 of gas turbine system 10 (see, FIG. 1) may also include a plurality of turbine shrouds 100 included within turbine 28. Turbine 28 may include a stage of turbine shrouds 100 (one shown). Turbine shrouds 100 may correspond with the stage of turbine blades 38 and/or the stage of stator vanes 40. That is, and as discussed herein, the stage of turbine shrouds 100 may be positioned within turbine 28 adjacent the stage of turbine blades 38 and/or the stage of stator vanes 40 to interact with and provide a seal in and/or may define the flow path (FP) of combustion gases 26 flowing through turbine 28. In the non-limiting example shown in FIG. 2, the stage of turbine shrouds 100 may be positioned radially adjacent and/or may substantially surround or encircle the stage of turbine blades 38. Turbine shrouds 100 may be positioned radially adjacent tip portion 48 of airfoil 46 for turbine blade 38. Additionally in the non-limiting example, turbine shrouds 100 may also be positioned axially adjacent and/or upstream of stator vanes 40 of turbine 28. Turbine shrouds 100 may be positioned between two adjacent stages of stator vanes that may surround and/or be positioned on either axially side of a single stage of turbine blades.

The stage of turbine shrouds may include a plurality of turbine shrouds 100 that may be coupled directly to and/or positioned circumferentially about casing 36 of turbine 28. In the non-limiting example shown in FIG. 2, turbine shrouds 100 may be coupled directly to casing 36 via an extension 52 extending radially inward (e.g., toward rotor 30) from casing 36 of turbine 28. Extension 52 may include an opening 54 that may be configured to be coupled to and/or receive a portion of turbine shrouds 100 to couple, position, and/or secure turbine shrouds 100 to casing 36 of turbine 28. In a non-limiting example, extension 52 may be coupled and/or fixed to casing 36 of turbine 28. More specifically, extension 52 may be circumferentially disposed around casing 36, and may be positioned radially adjacent turbine blades 38. In another non-limiting example, extension 52 may be formed integral with casing 36 for coupling, positioning, and/or securing turbine shrouds 100 directly to casing 36. Similar to turbine blades 38 and/or stator vanes 40, although only a portion of the stage of turbine shrouds 100 of turbine 28 is shown in FIG. 2, turbine 28 may include a plurality of stages of turbine shrouds 100, positioned axially throughout casing 36 of turbine 28 and coupled to casing 26 using extension 52.

Figure 3:
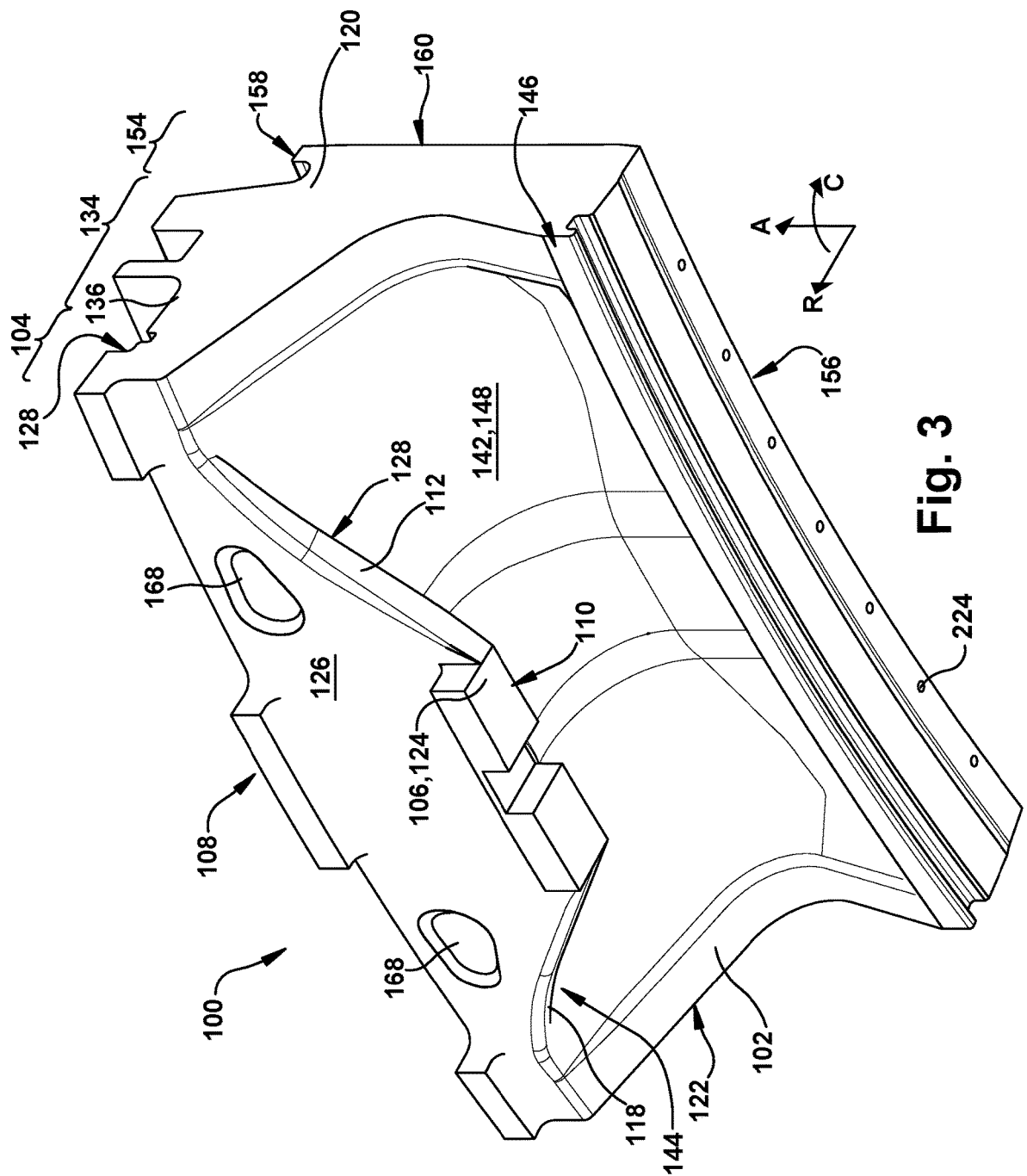
FIG. 3 shows a perspective view of the turbine shroud of FIG. 2, according to embodiments of the disclosure.
Figure 4:
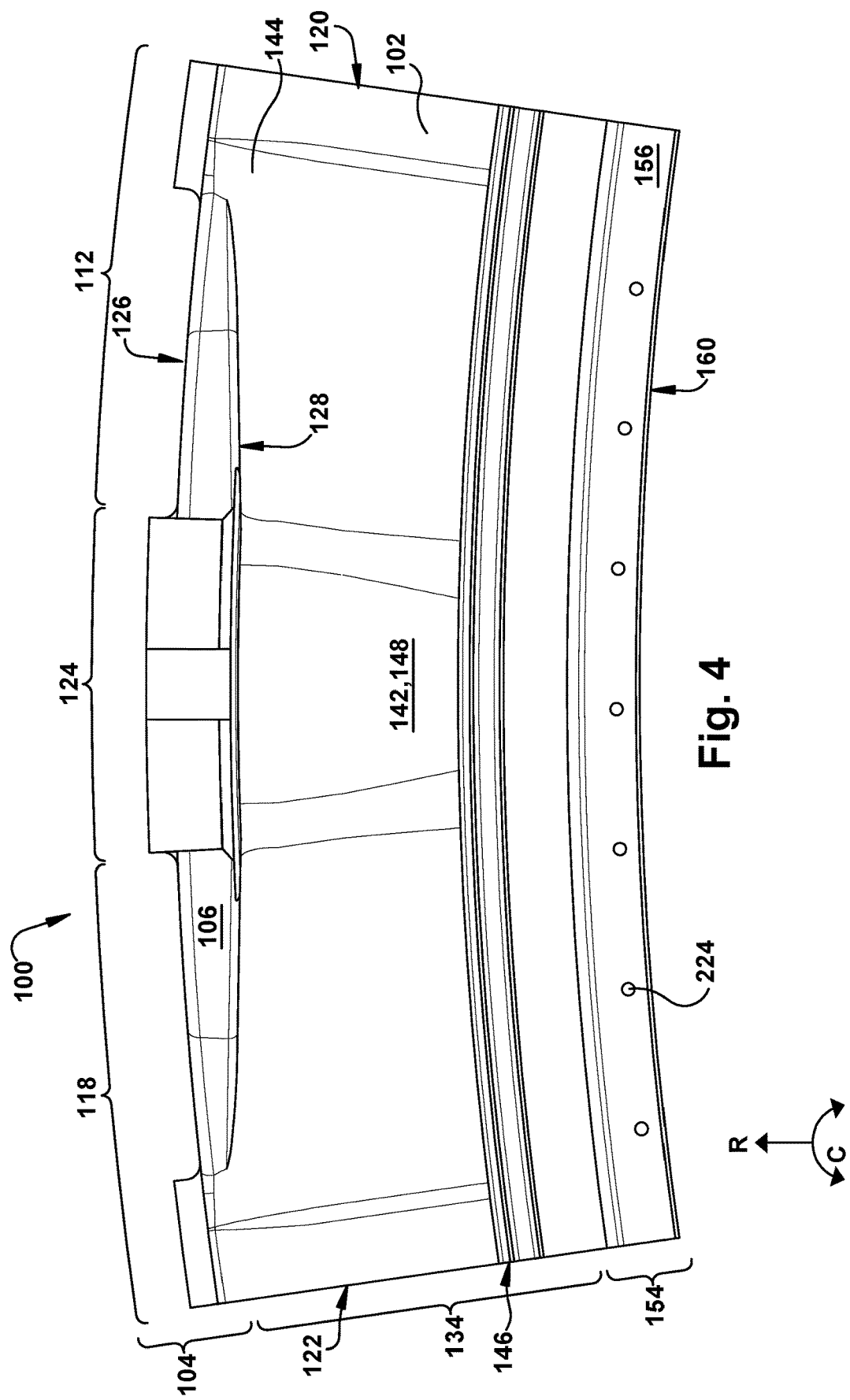
FIG. 4 shows a front view of the turbine shroud of FIG. 3, according to embodiments of the disclosure.
Figure 5:
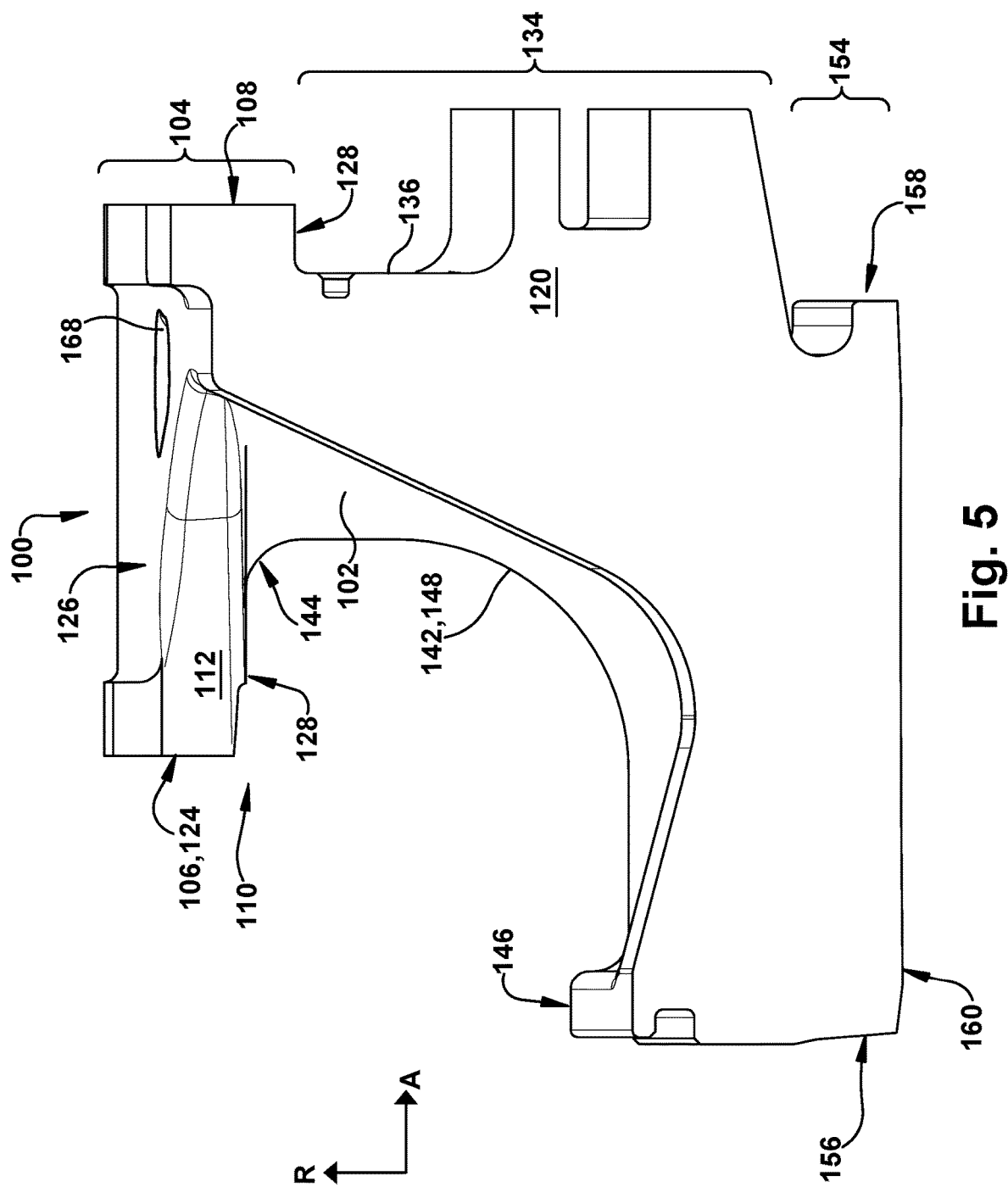
FIG. 5 shows a first side view of the turbine shroud of FIG. 3, according to embodiments of the disclosure.
Figure 6:
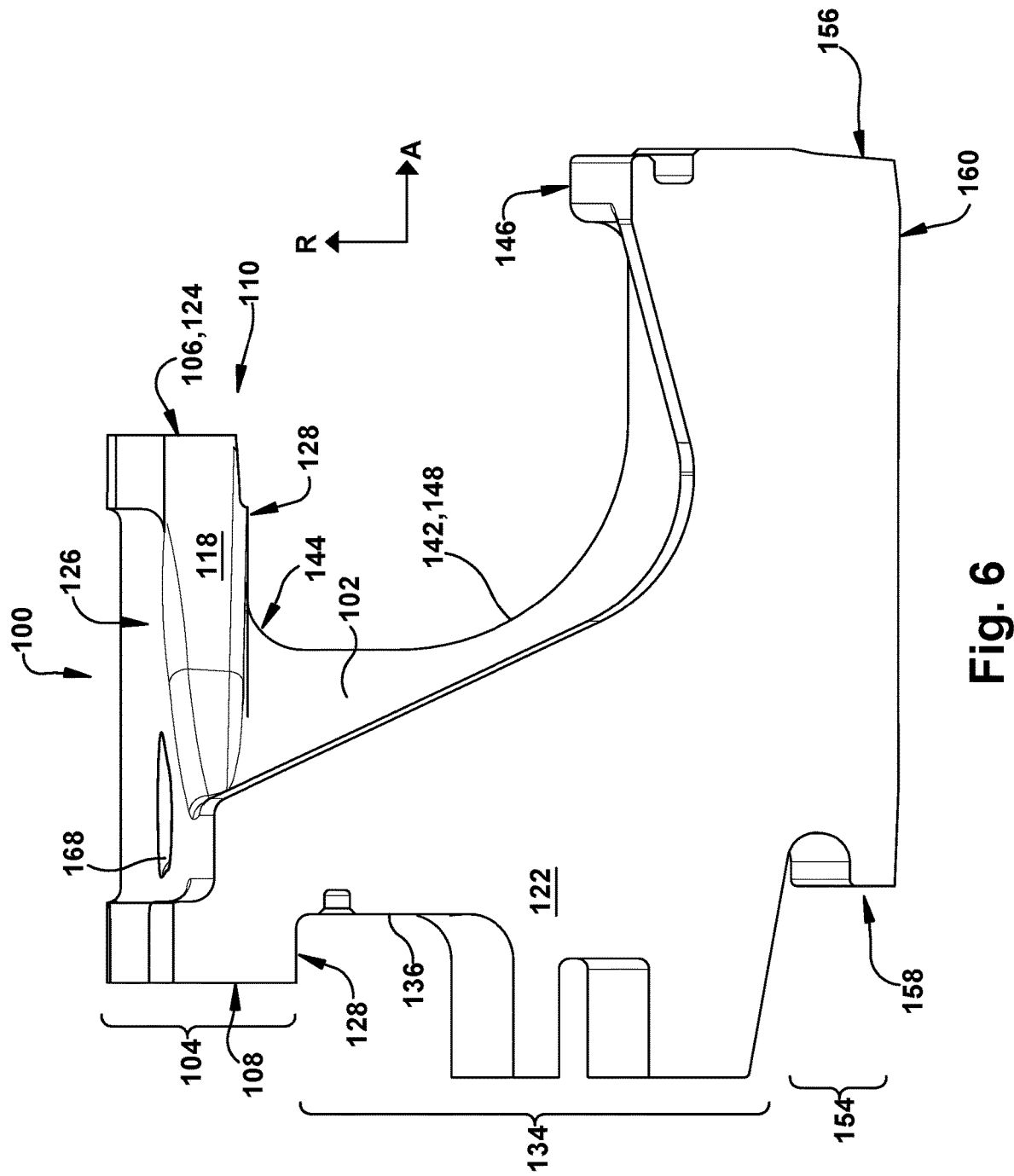
FIG. 6 shows a second side view of the turbine shroud of FIG. 3, according to embodiments of the disclosure.
Figure 7:
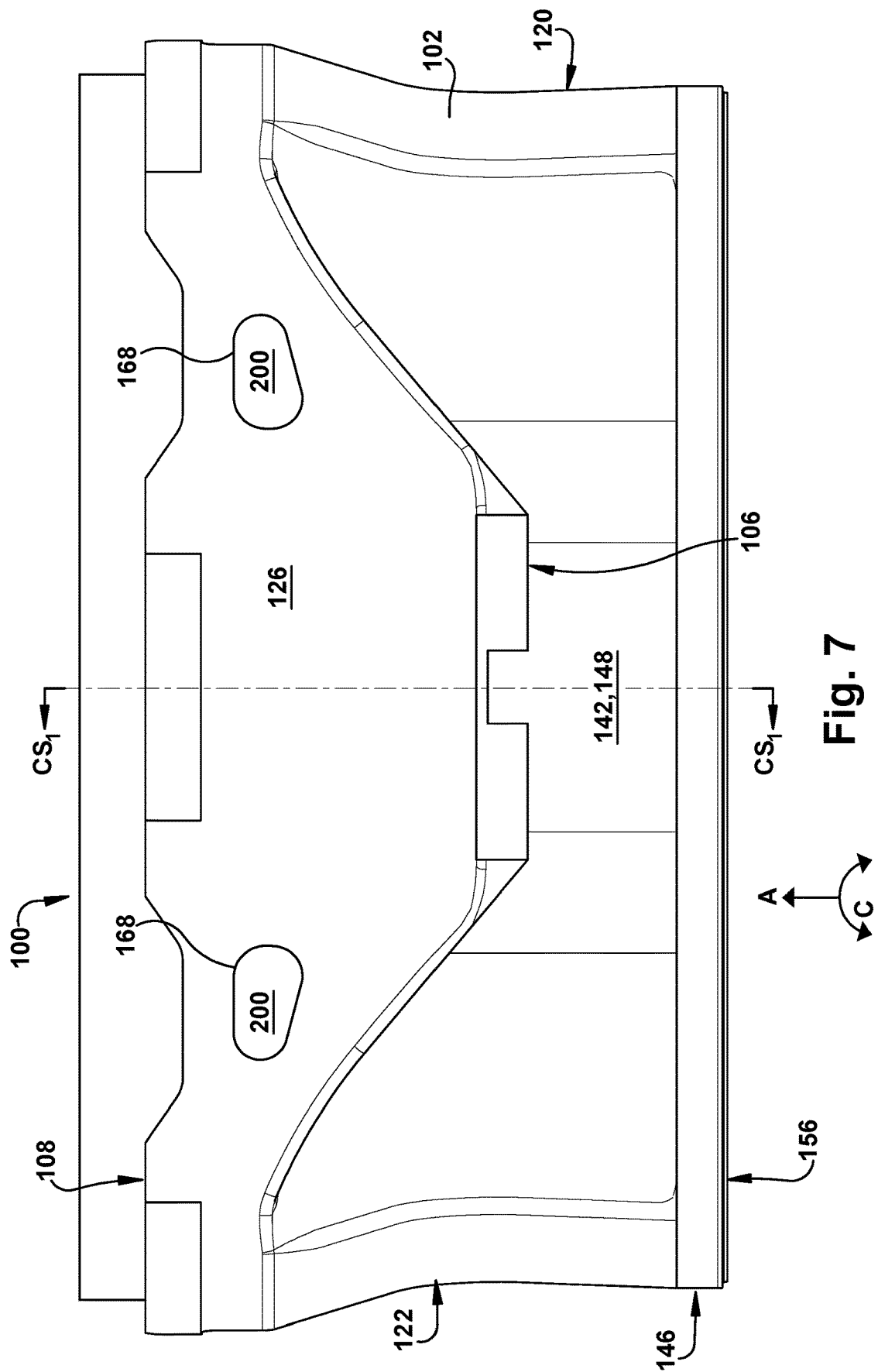
FIG. 7 shows a top view of the turbine shroud of FIG. 3, according to embodiments of the disclosure.

FIGS. 3-7 show various views of turbine shroud 100 of turbine 28 for gas turbine system 10 of FIG. 1. Specifically, FIG. 3 shows an isometric view of turbine shroud 100, FIG. 4 shows a front view of turbine shroud 100, FIG. 5 shows a first side view of turbine shroud 100, FIG. 6 shows a second view of turbine shroud 100, and FIG. 7 shows a top view of turbine shroud 100.

The non-limiting example of turbine shroud 100, and its various components, may be addressed herein with reference to all of FIGS. 3-7 to ensure that each of the plurality of components are adequately and accurately described and shown. When applicable, specific figures of the collective FIGS. 3-7 may be referenced when discussing a component(s) or feature(s) of turbine shroud 100. Additionally, several reference lines or directions shown in FIGS. 1 and 2 may be used regularly herein, with respect to FIGS. 3 and 7. For example in each of FIGS. 3-7, "A" may refer to an axial orientation or axis, "R" may refer to a radial axis substantially perpendicular with axis A, and "C" may refer to a circumferential direction, movement, and/or position along a path centric about axis "A," as discussed herein.

Turbine shroud 100 may include a body 102. In the non-limiting example shown in FIGS. 3-7, turbine shroud 100 may include and/or be formed as a unitary body 102 such that turbine shroud 100 is a single, continuous, and/or non-disjointed component or part. In the non-limiting example shown in FIGS. 3-7, because turbine shroud 100 includes unitary body 102, turbine shroud 100 may not require the building, joining, coupling, and/or assembling of various parts to completely form turbine shroud 100, and/or may not require building, joining, coupling, and/or assembling of various parts before turbine shroud 100 can be installed and/or implemented within turbine system 10 (see, FIG. 1). Rather, once single, continuous, and/or non-disjointed unitary body 102 for turbine shroud 100 is built, as discussed herein, turbine shroud 100 may be immediately installed within turbine system 10.

In the non-limiting example, unitary body 102 of turbine shroud 100, and the various components and/or features of turbine shroud 100, may be formed using any suitable additive manufacturing process and/or method. For example, turbine shroud 100 including unitary body 102 may be formed by direct metal laser melting (DMLM) (also referred to as selective laser melting (SLM)), direct metal laser sintering (DMLS), electronic beam melting (EBM), stereolithography (SLA), binder jetting, or any other suitable additive manufacturing process. As such, unitary body 102 of turbine shroud 100, and the various components and/or features integrally formed on and/or in unitary body 102 of turbine shroud 100, may be formed during a single, additive manufacturing process and/or method. Additionally, unitary body 102 of turbine shroud 100 may be formed from any material that may be utilized by additive manufacturing process(es) to form turbine shroud 100, and/or capable of withstanding the operational characteristics (e.g., exposure temperature, exposure pressure, and the like) experienced by turbine shroud 100 within gas turbine system 10 during operation.

As a result of being formed from unitary body 102, turbine shroud 100 may include various integrally formed portions that each may include different features, components, and/or segments that may provide a seal in and/or define the flow path (FP) of combustion gases 26 flowing through turbine 28 (see, FIG. 2). That is, and because turbine shroud 100 includes unitary body 102 formed using any suitable (single) additive manufacturing process and/or method, the features, components, and/or segments of turbine shroud 100 may be formed integrally with unitary body 102. The terms "integral features" or "integrally formed features" may refer to features formed on or in unitary body 102 during the (single) additive manufacturing process, features formed from the same material as unitary body 102, and/or features formed on or in unitary body 102 such that the features are not fabricated using distinct process(es) and/or raw material components that are separately and subsequently built, joined, coupled, and/or assembled on or in unitary body 102 of turbine shroud 100.

For example, turbine shroud 100 may include a unitary body 102 having a support portion 104. Support portion 104 may be coupled directly to and/or aid in the coupling of turbine shroud 100 to turbine casing 36 and/or extension 52. Support portion 104 of unitary body 102 may include a forward end 106, and an aft end 108 positioned opposite forward end 106. Forward end 106 may be positioned axially upstream of aft end 108.

In the non-limiting example shown in FIGS. 3, 4, and 7, forward end 106 may include a protruding and/or a converging shape, an orientation, and/or a configuration 110 (hereafter, "configuration 110"). That is, and as shown in the non-limiting example of FIGS. 3, 4 and 7, forward end 106 of support portion 104 may be formed to include configuration 110 that may include opposing angular and/or curved walls 112, 118 that extend axially from opposing sides or slash faces 120, 122 of unitary body 102 and converge on a central wall 124. Central wall 124 of forward end 106 may be positioned and/or formed upstream of walls 112, 118, and/or may be positioned axially forward of the remaining portions of support portion 104 of unitary body 102. That is, central wall 124 may be the axially-forward most portion of forward end 106 of support portion 104 of unitary body 102.

Additionally, support portion 104 may also include a first surface 126, and a second surface 128. First surface 126 and second surface 128 may extend (axially) between forward end 106 and aft end 108. Additionally, first surface 126 and second surface 128 may be formed or extend substantially perpendicular to forward end 106 and/or aft end 108 of support portion 104. As shown in the non-limiting example, second surface 128 of support portion 104 may be positioned and/or formed (radially) opposite first surface 110.

In the non-limiting example shown in FIGS. 3-7, unitary body 102 of turbine shroud 100 may also include an intermediate portion 134. Intermediate portion 134 may be formed integral with and extending from support portion 104. For example, intermediate portion 134 may be formed integral with and extending away from support portion 104. More specifically, intermediate portion 134 of unitary body 102 may be formed integral with and may extend radially away from second surface 128 of support portion 104. In the non-limiting example, intermediate portion 134 of turbine shroud 100 may be positioned radially between support portion 104 of unitary body 102 and turbine blade 38 of turbine 28 (see, FIG. 2).

Intermediate portion 134 may include various features and/or segments of unitary body 102 for turbine shroud 100. The various features and/or segments discussed herein may extend and/or be formed between opposing slash faces 120, 122 of unitary body 102. For example, intermediate portion 134 may include an aft segment 136 extending perpendicularly and/or radially away from second surface 128 of support portion 104. Additionally as shown in FIGS. 3, 5, and 6, aft segment 136 of intermediate portion 134 may extend from second surface 128 substantially adjacent aft end 108 of support portion 104. In the non-limiting example, at least a portion of aft segment 136 of intermediate portion 134 may be positioned axially upstream of aft end 108 of support portion 104 of unitary body 102.

Intermediate portion 134 may also include a non-linear segment 142 extending away from second surface 128 of support portion 104. As shown in FIGS. 3, 5, and 6, non-linear segment 142 of intermediate portion 134 may extend substantially radially from second surface 128, between forward end 106 and aft end 108 of support portion 104 of unitary body 102, and axially adjacent aft segment 136. Non-linear segment 142 of intermediate portion 134 may include a first end 144 formed integral with second surface 128 of support portion 104 between forward end 106 and aft end 108. Additionally, non-linear segment 142 may include a second end 146 positioned opposite first end 144. Second end 146 of non-linear segment 142 may positioned radially adjacent and axially upstream of first end 144.

Additionally, second end 146 of non-linear segment 142 of intermediate portion 134 may also be positioned axially upstream of forward end 106 of support portion 104. A curved section 148 may extend between first end 144 and second end 146 of non-linear segment 142. That is, non-linear segment 142 may also include curved section 148 extending between first end 144 and second end 146. In the non-limiting example shown in FIGS. 3, 5, and 6, curved section 148 extending between first end 144 and second end 146 may include a substantially concave-shape or configuration, such that a side view of intermediate portion 134 and/or unitary body 102 of turbine shroud 100 may appear to be a backwards "C." As a result of extending between first end 144 and second end 146, at least a portion of curved section 148 may also be positioned or extend axially upstream of forward end 106 of support portion 104.

Unitary body 102 of turbine shroud 100 may also include a seal portion 154. Seal portion 154 may be formed integral with intermediate portion 134. That is, seal portion 154 of unitary body 102 may be formed integral with intermediate portion 134. Seal portion 154 may be positioned opposite support portion 104, for example, radially opposite support portion 104. In the non-limiting example, and as discussed herein, seal portion 154 of turbine shroud 100 may be positioned radially between intermediate portion 134 of unitary body 102 and turbine blade 38 of turbine 28, and may at least partially define a flow path (FP) for combustion gases 26 flowing through turbine 28 (see, FIG. 2).

In the non-limiting example, seal portion 154 may include a forward end 156. Forward end 156 of seal portion 154 may be formed and/or extend between opposing slash faces 120, 122 of unitary body 102. Forward end 156 may be formed substantially adjacent to, perpendicular to, and/or axially upstream of second end 146 of non-linear segment 142. Forward end 156 of seal portion 154 may also be positioned axially upstream of forward end 106 of support portion 104. Because unitary body 102 includes support 104 and intermediate portion 134 having non-linear segment 142, as discussed herein, forward end 156 of seal portion 154 may be positioned axially upstream of support portion 104 in a substantially cantilever manner or fashion without being directly coupled or connected to, and/or being formed integral with support portion 104. As a result, forward end 156, as well as other portions of seal portion 154, may thermally expand during operation of turbine 28 without causing undesirable mechanical stress or strain on other portions (e.g., support portion 104, intermediate portion 134) of turbine shroud 100.

Seal portion 154 may also include an aft end 158 positioned and/or formed opposite forward end 156. Aft end 158 may also be positioned downstream of forward end 156, such that combustion gases 26 flowing through the flow path (FP) defined within turbine 28 may flow adjacent forward end 156 before flowing by adjacent aft end 158 of seal portion 154 of unitary body 102 (see, FIG. 2). Aft end 158 of seal portion 154 may be formed integral with, radially adjacent, and/or radially aligned with aft segment 136 of intermediate portion 134.

In the non-limiting example shown in FIGS. 3-7, seal portion 154 may also include a hot gas path (HGP) surface 160. HGP surface 160 of seal portion 154 may be integrally formed and/or extend axially between forward end 156 and aft end 158. Additionally, HGP surface 160 may be integrally formed and/or extend circumferentially between opposing slash faces 120, 122 of unitary body 102. HGP surface 160 may also be formed radially opposite first surface 126 of support portion 104 of unitary body 102. As discussed herein, HGP surface 160 may be positioned adjacent a hot gas flow path (FP) of combustion gases 26 of turbine 28. That is, and as shown in FIG. 2, HGP surface 160 may be positioned, formed, face, and/or directly exposed to the hot gas flow path (FP) of combustion gases 26 flowing through turbine casing 36 of turbine 28 for gas turbine system 10 (see, FIG. 2). Additionally when included in turbine casing 36, HGP surface 160 of unitary body 102 for turbine shroud 100 may be positioned radially adjacent tip portion 48 of airfoil 46 (see, FIG. 2).

As discussed herein, unitary body 102 of turbine shroud 100 may include first slash face 120 and second slash face 122. As shown in the non-limiting example of FIGS. 5 and 6, opposing slash faces 120, 122 of unitary body 102 may form side walls extending radially over unitary body 102 of turbine shroud 100. More specifically, first slash face 120 may extend adjacent to and radially between first surface 126 of support portion 104 and HGP surface 160 of seal portion 154, and second slash face 122 may extend adjacent to and radially between first surface 126 of support portion 104 and HGP surface 160 of seal portion 154, circumferentially opposite first slash face 120. As such, slash faces 120, 122 may extend over the various portions forming unitary body 102. Slash faces 120, 122 specifically may extend over support portion 104, intermediate portion 134, and/or seal portion 154, to form circumferential boundaries, side walls and/or side surfaces for unitary body 102.

In the non-limiting example shown in FIGS. 3 and 7, unitary body 102 for turbine shroud 100 may also include at least one inlet opening 168. Inlet opening(s) 168 may be formed in support portion 104. For example, inlet opening(s) 168 may be formed in and/or through first surface 126 of support portion 104, between forward end 106 and aft end 108. Additionally, inlet opening(s) 168 may also be formed in first surface 126 and/or through support portion 104 axially downstream of non-linear segment 142 of intermediate portion 134. In a non-limiting example, inlet opening(s) 168 may be in fluid communication with a cooling passage (see, FIG. 8) formed through unitary body 102. More specifically, inlet opening(s) 168 formed in first surface 126 may extend through at least a portion of support portion 104, and may be in fluid communication with a cooling passage formed through and/or included within support portion 104, intermediate portion 134, and/or seal portion 154 of unitary body 102.

Figure 8:
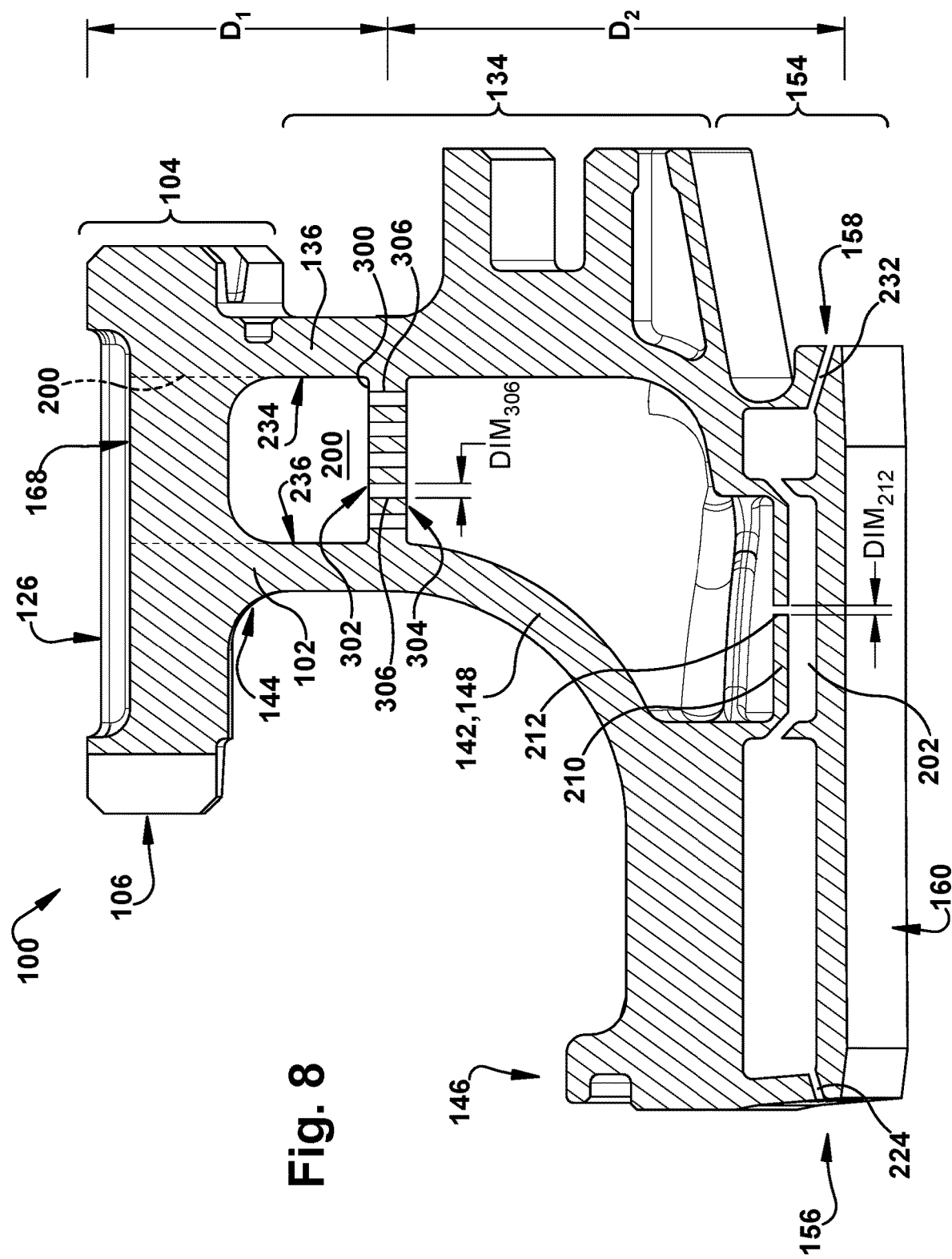
FIG. 8 shows a side cross-sectional view of the turbine shroud of FIG. 7 taken along line CS1-CS1, according to embodiments of the disclosure.
Figure 9:
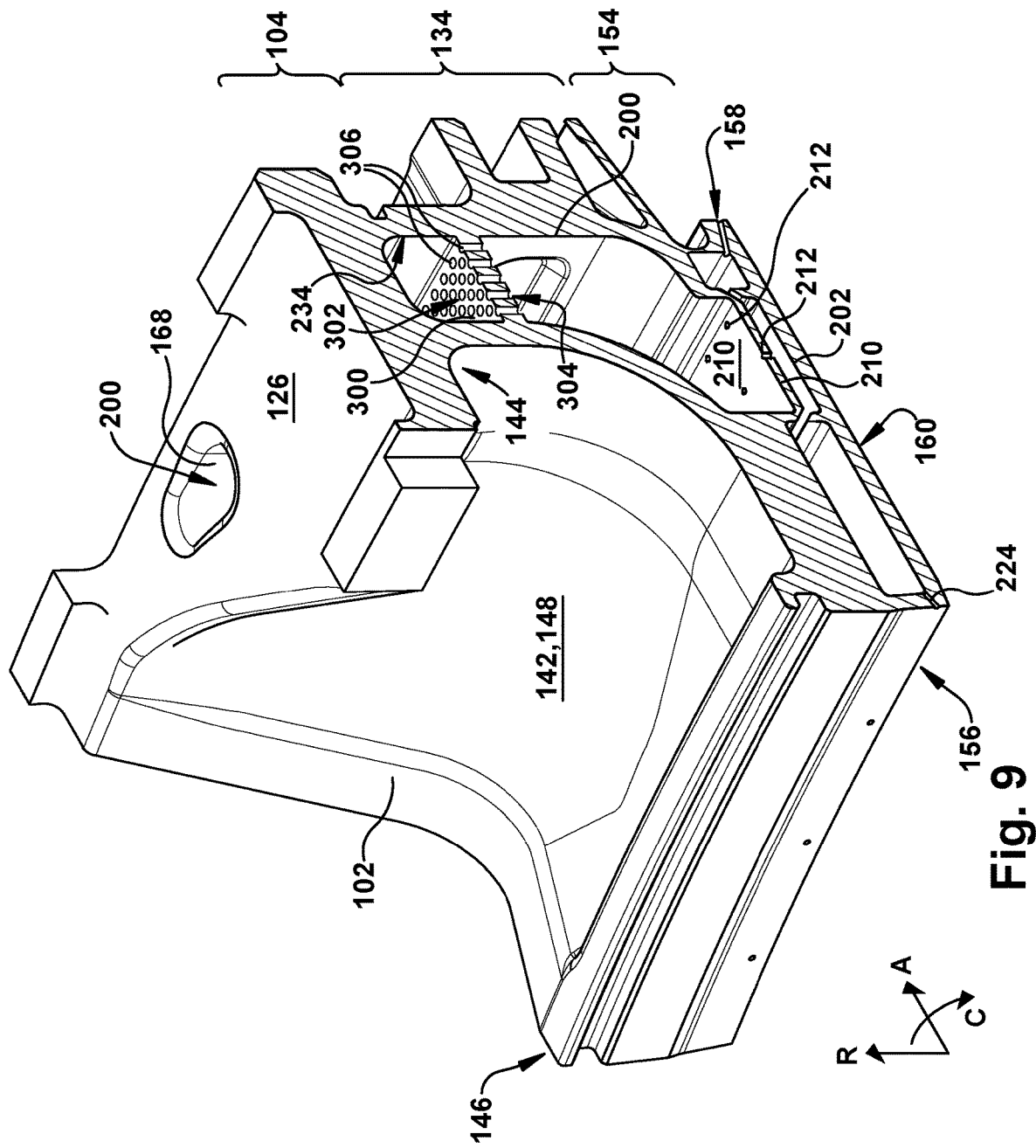
FIG. 9 shows a perspective view of the turbine shroud of FIG. 8, according to embodiments of the disclosure.

Turbine shroud 100 may also include plenum(s) and/or cooling passage(s) formed therein for cooling turbine shroud 100 during operation of turbine 28 of gas turbine system 10. Turning to FIGS. 8 and 9, with continued reference to FIGS. 3-7, the various plenum(s) and/or cooling passage(s) of turbine shroud 100 are described. FIG. 8 shows a side cross-sectional view of turbine shroud 100 taken along line CS1-CS1 in FIG. 7, and FIG. 9 shows a perspective cross-sectional view turbine shroud 100 shown in FIG. 8. It is understood that similarly numbered and/or named components may function in a substantially similar fashion. Redundant explanation of these components has been omitted for clarity.

As shown in FIGS. 8 and 9, turbine shroud 100 may include at least one plenum 200. Plenum 200 may be formed and/or extend through a portion of unitary body 102 of turbine shroud 100. Plenum 200 may extend through support portion 104 and intermediate portion 134. More specifically, plenum 200 may extend (radially) through at least a portion of support portion 104 and intermediate portion 134, and/or seal portion 154 of unitary body 102. In the non-limiting example shown, plenum 200 may extend through the entirety of support portion 104, and intermediate portion 134, but only may extend through a portion of seal portion 154. In other non-limiting examples (not shown), plenum 200 may not extend into and/or (partially) through seal portion 154, but rather may end within intermediate portion 134. Briefly returning to FIG. 4, the portion of plenum 200 (shown in phantom) formed within intermediate portion 134 and seal portion 154 may extend between and/or adjacent opposing slash faces 120, 122. Although only a single plenum 200 is shown in FIGS. 8 and 9, it is understood that turbine shroud 100 may include more plenums (see, FIG. 12). As such, the number of plenums 200 depicted in the figures is merely illustrative.

In the non-limiting example, plenum 200 may be fluidly coupled to and/or in direct fluid communication with inlet opening(s) 168 formed in support portion 104. That is, and as shown in FIGS. 7-9, plenum 200 may be in direct fluid communication with each inlet opening 168 formed in first surface 126 of support portion 104 for turbine shroud 100. As discussed herein, plenum 200 may receive cooling fluid (CF)(see, FIGS. 8 and 9), via inlet opening(s) 168, flowing within turbine 28 and may provide the cooling fluid (CF) to distinct cooling passages formed in turbine shroud 100 to cool turbine shroud 100 during operation.

As shown in FIGS. 8 and 9, turbine shroud 100 may include a cooling passage 202 formed, positioned, and/or extending within unitary body 102 of turbine shroud 100. More specifically, cooling passage 202 of turbine shroud 100 may be positioned within and/or extend through seal portion 154 of unitary body 102, between and/or adjacent forward end 156 and aft end 158 of seal portion 154. Additionally, and as shown in FIG. 4, cooling passage 202 (shown in phantom) may extend through seal portion 154 of unitary body 102 between and/or adjacent opposing slash faces 120, 122. Cooling passage 202 may be positioned between plenum 200 and HGP surface 160 of seal portion 154. For example, cooling passage 202 may be positioned within seal portion 154 radially between plenum 200 and HGP surface 160 of seal portion 154. In the non-limiting example shown in FIGS. 8 and 9, and as discussed herein, at least a portion of cooling passage 202 may be radially aligned with plenum 200. Also as discussed herein, cooling passage 202 may be in fluid communication with plenum 200.

Plenum 200 and cooling passage 202 formed in unitary body 102 of turbine shroud 100 may be separated by a rib 210. That is, and as shown in FIGS. 8 and 9, rib 210 may be formed in seal portion 154 of unitary body 102, between and may separate cooling passage 202 and plenum 200. Similar to other features discussed herein, rib 210 may be formed integral with unitary body 102 of turbine shroud 100, and may be formed within seal portion 154 radially outward from HGP surface 160. Additionally, rib 210 may extend within unitary body 102 between and may be formed integral with opposing slash faces 120, 122.

In order to provide cooling passage 202 with a cooling fluid, unitary body 102 of turbine shroud 100 may also include a plurality of impingement openings 212 formed therethrough. That is, and as shown in FIGS. 8 and 9, unitary body 102 may include a plurality of impingement openings 212 formed through rib 210. The plurality of impingement openings 212 formed through rib 210 may fluidly couple plenum 200 and cooling passage 202. As discussed herein, during operation of gas turbine system 10 (see, FIG. 1), cooling fluid may flow from plenum 200 through the plurality of impingement openings 212 to cooling passage 202 to substantially cool turbine shroud 100.

It is understood that the size and/or number of impingement openings 212 formed through rib 210, as shown in FIGS. 8 and 9, is merely illustrative. As such, turbine shroud 100 may include larger or smaller impingement openings 212, and/or may include more or less impingement openings 212 formed therein. Additionally, although the plurality of impingement openings 212 are shown to be substantially uniform in size and/or shape, it is understood that each of the plurality of impingement openings 212 formed on turbine shroud 100 may include distinct sizes and/or shapes. The size, shapes, and/or number of impingement openings 212 formed in unitary body 102 of turbine shroud 100 may be dependent, at least in part on the operational characteristics (e.g., exposure temperature, exposure pressure, position within turbine casing 36, and the like) of gas turbine system 10 during operation. Additionally, or alternatively, the size, shapes, and/or number of impingement openings 212 may be dependent, at least in part on the characteristics (e.g., rib 210 thickness, dimension of cooling passage 202, volume of cooling passage 202, dimension/volume of plenum 200 and so on) of turbine shroud 100/cooling passage 202.

Also shown in FIGS. 8 and 9, unitary body 102 of turbine shroud 100 may include a plurality of forward exhaust holes 224. The plurality of forward exhaust holes 224 may be in fluid communication with cooling passage 202. More specifically, each of the plurality of forward exhaust holes 224 may be in fluid communication with and may extend axially from cooling passage 202 of turbine shroud 100. In the non-limiting example shown in FIGS. 8 and 9, the plurality of forward exhaust holes 224 may extend through unitary body 102, from cooling passage 202 to forward end 156 of seal portion 154. That is, each of the plurality of forward exhaust holes 224 may be formed through forward end 156 of seal portion 154 and may extend axially through unitary body 102 to be fluidly coupled to cooling passage 202. During operation, and as discussed herein, the plurality of forward exhaust holes 224 may discharge cooling fluid from cooling passage 202, adjacent forward end 156 of seal portion 154, and into the hot gas flow path (FP) of combustion gases 26 flowing through turbine 28.

It is understood that the number of forward exhaust holes 224 shown in the non-limiting example of FIGS. 8 and 9 is merely illustrative. As such, forward end 156 of seal portion 154 may include more or less forward exhaust holes 224 than those shown in FIGS. 8 and 9. Additionally, although shown as being substantially rectangular and linear, it is understood that forward exhaust holes 224 may be substantially round and/or non-linear openings, channels and/or manifolds.

Also shown in FIGS. 8 and 9, turbine shroud 100 may include a plurality of aft exhaust holes 232. The plurality of aft exhaust holes 232 may be in fluid communication with cooling passage 202. More specifically, each of the plurality of aft exhaust holes 232 may be in fluid communication with and may extend axially from cooling passage 202 of turbine shroud 100. In the non-limiting example, the plurality of aft exhaust holes 232 may extend axially through unitary body 102, from cooling passage 202 to aft end 158 of seal portion 154. That is, each of the plurality of aft exhaust holes 232 may be formed through aft end 158 of seal portion 154 and may extend axially through unitary body 102 to be fluidly coupled to cooling passage 202. As discussed herein, the plurality of aft exhaust holes 232 may discharge cooling fluid from cooling passage 202, adjacent aft end 158 of seal portion 154, and into the hot gas flow path (FP) of combustion gases 26 flowing through turbine 28.

Similar to the plurality of forward exhaust holes 224, it is understood that the number of aft exhaust holes 232 shown in the non-limiting example of FIGS. 8 and 9 is merely illustrative. As such, aft end 158 of seal portion 154 may include more or less aft exhaust holes 232 than those shown in FIGS. 8 and 9. Additionally, the shape of aft exhaust holes 232 (e.g., substantially rectangular and linear), is merely illustrative, and each of the plurality of exhaust holes 232 included in unitary body 102 may be formed in substantially distinct shapes (e.g., non-linear openings, channels and/or manifolds).

As shown in FIGS. 8 and 9, turbine shroud 100 may also include at least one shot peen screen 300. More specifically, unitary body 102 of turbine shroud 100 may include shot peen screen(s) 300 formed integrally therein. In the non-limiting example, unitary body 102 may include a single shot peen screen 300. In other non-limiting examples discussed herein (see, FIG. 12), unitary body 102 may include more than one shot peen screen 300. As discussed herein, shot peen screen 300 included within unitary body 102 may prevent shot from passing through shot peen screen 300 when performing a shot peening process on unitary body 102 of turbine shroud 100. Additionally, shot peen screen 300 formed integrally within unitary body 102 may provide additional support, structure, and/or rigidity to unitary body 102 (e.g., intermediate portion 134) during operation.

Shot peen screen 300 may be positioned within plenum 200 and may extend and/or be positioned within intermediate portion 134 of unitary body 102. Additionally, shot peen screen 300 may extend between opposing slash faces 120, 122 of unitary body 102. As such, shot peen screen 300 may extend over an entire circumferential length of plenum 200, between opposing slash faces 120, 122 of unitary body 102 for turbine shroud 100. In the non-limiting example shown in FIGS. 8 and 9, shot peen screen 300 also extends between aft segment 136 of intermediate portion 134 and non-linear segment 142 of intermediate portion 134. Shot peen screen 300 may be integrally formed within plenum 200. The integrally formed shot peen screen may prevent shot from passing through the shot peen screen when performing a shot peening process on the unitary body of the turbine shroud. More specifically, shot peen screen 300 may be integrally formed with and extend axially between aft segment 136 of intermediate portion 134 and non-linear segment 142 of intermediate portion 134 within plenum 200. As such, shot peen screen 300 may extend over an entire axial length of plenum 200, between aft segment 136 and non-linear segment 142. In the non-limiting example, shot peen screen 300 may be formed integral with and may extend axially from and/or between an internal surface 234 of aft segment 136 and an internal surface 236 of non-linear segment 142. As shown in FIGS. 8 and 9, internal surfaces 234, 236 may define plenum 200 of unitary body 102 for turbine shroud 100.

Also shown in FIGS. 8 and 9, shot peen screen 300 may be positioned between support portion 104 and seal portion 154. More specifically, shot peen screen 300 may be formed integral within unitary body 102 and positioned radially between inlet opening 168 formed in support portion 104 and cooling passage 202 formed in seal portion 154. In the non-limiting example shown in FIG. 8, shot peen screen 300 may be spaced from inlet opening 168 formed in support portion 104 a first distance ($D_1$). Additionally as shown in FIG. 8, shot peen screen 300 may be spaced from cooling passage 202 formed in seal portion 154 a second distance ($D_2$). In the non-limiting example, second distance ($D_2$) may be greater than the first distance ($D_1$). As such, shot peen screen 300 may be positioned radially closer to inlet opening 168 than cooling passage 202. In other non-limiting examples (see, FIGS. 10 and 11), shot peen screen 300 may be formed in different radial positions within plenum 200.

Shot peen screen 300 may include a top surface 302 and a bottom surface 304. Top surface 302 of shot peen screen 300 may be positioned within plenum 200 radially adjacent to and/or may face inlet opening 168 formed in support portion 104. Bottom surface 304 of shot peen screen 300 may be formed or positioned radially opposite top surface 302. Additionally, bottom surface 304 may be positioned within plenum 200 radially adjacent to and/or may face rib 210 and/or cooling passage 202 formed in seal portion 154.

As shown in FIGS. 8 and 9, shot peen screen 300 may also include a plurality of voids 306 formed therethrough. That is, a plurality of voids 306 may be formed in and/or may extend through shot peen screen 300, between top surface 302 and bottom surface 304. The plurality of voids may be spaced over shot peen screen 300 to allow cooling fluid (CF) to flow from inlet opening 168, through plenum 200 and shot peen screen 300, and to cooling passage 200 to cool turbine shroud 100 during operation, as discussed herein. In the non-limiting example, each of the plurality of voids 306 may include a predetermined dimension ($DIM_{306}$) (e.g., diameter). The predetermined dimension ($DIM_{306}$) of each of the plurality of voids 306 for shot peen screen 300 may be sized to be smaller than a dimension (e.g., diameter) of the shot used in the shot peening process that may be performed on unitary body 102. That is, unitary body 102 of turbine shroud 100 may undergo a shot peening process post build. To prevent the shot from contacting rib 210 and/or being embedded into and subsequently obstructing impingement openings 212, shot peen screen 300 may be integrally formed within plenum 200. Forming the plurality of voids of shot peen screen 300 to include the predetermined dimension ($DIM_{306}$) that is smaller than the dimension of the shot used during the shot peening process may ensure that the shot cannot reach and/or contact rib 210 and/or impingement openings 212. Rather, all of the shot that may flow through inlet opening 168 may contact and/or be caught/blocked by shot peen screen 300.

The predetermined dimension ($DIM_{306}$) for each of the plurality of voids 306 formed in shot peen screen 300 may also be larger than a dimension ($DIM_{212}$) (e.g., diameter) for impingement openings 212 formed in rib 210. In a non-limiting example, the predetermined dimension ($DIM_{306}$) for each of the plurality of voids 306 may be approximately two (2) to six (6) times larger than the dimension ($DIM_{212}$) for impingement openings 212. Making the predetermined dimension ($DIM_{306}$) for each void 306 larger than the dimension ($DIM_{212}$) for impingement openings 212 may ensure that the cooling fluid (CF) flowing through plenum 200 does not experience a pressure drop when flowing through voids 306, before flowing through impingement openings 212 to cooling passage 200, as discussed herein.

It is understood that the size and/or number of voids 306 formed through shot peen screen 300, as shown in FIGS. 8 and 9, is illustrative. As such, shot peen screen 300 may include larger or smaller voids 306, and/or may include more or less voids 306 formed therein. Additionally, although the plurality of voids 306 are shown to be substantially uniform in size and/or shape, it is understood that each of the plurality of voids 306 formed through shot peen screen may include distinct sizes and/or shapes. The size, shapes, and/or number of voids 306 formed through shot peen screen 300 may be dependent, at least in part on the size, number, and/or firing rate of the shot during the shot peen process performed on turbine shroud 100.

During operation of gas turbine system 10 (see, FIG. 1), cooling fluid (CF) may flow through unitary body 102 to cool turbine shroud 100. More specifically, as turbine shroud 100 is exposed to combustion gases 26 flowing through the hot gas flow path of turbine 28 (see, FIG. 2) during operation of gas turbine system 10 and increases in temperature, cooling fluid may be provided to and/or may flow through the various features (e.g., inlet opening 168, plenum 200, passage 202, holes 224, 232, and the like) formed and/or extending through unitary body 102 to cool turbine shroud 100. In a non-limiting example, cooling fluid may first be provided to turbine shroud 100 adjacent support portion 104 of unitary body 102 from a distinct portion, feature and/or area of turbine 28. The cooling fluid may flow through inlet opening(s) 168 formed in first surface 126 of support portion 104 into plenum 200. In the non-limiting example shown in FIGS. 8 and 9 where unitary body 102 includes a single plenum 200, cooling fluid may flow radially through each inlet opening(s) 168 and may be collected and/or mix within plenum 200.

The cooling fluid may flow from inlet opening(s) 168, through plenum 200. More specifically, the cooling fluid may flow from inlet opening 168, through plenum 200 and toward shot peen screen 300. The cooling fluid may subsequently flow through shot peen screen 300, and more specifically through the plurality of voids 306 formed through shot peen screen 300, and may continue to flow through the remainder of plenum 200 toward HGP surface 160 of seal portion 154 and/or radially toward the cooling passage 202 formed within seal portion 154. In the non-limiting example, the cooling fluid provided to plenum 200, and flowed through shot peen screen 300, may flow radially toward rib 210, and subsequently through the plurality of impingement openings 212 to cooling passage 202. In the non-limiting example, the cooling fluid may flow through the plurality of impingement openings 212 formed in rib 210 and may enter cooling passage 202. The cooling fluid flowing into/through cooling passage 202 may cool and/or receive heat from HGP surface 160 of seal portion 154 for turbine shroud 100. That is, once inside cooling passage 202, the cooling fluid may be dispersed and/or may flow axially toward one of forward end 156 or aft end 158 of seal portion 154. The cooling fluid may flow to the respect forward end 156 or aft end 158 via cooling passage 202 as a result of, for example, the internal pressure within cooling passage 202.

Once the cooling fluid has flowed or dispersed through cooling passage 202, the cooling fluid may flow to distinct exhaust holes 224, 232 formed through sealed portion 154 of unitary body 102. For example, cooling fluid flowed to a portion of cooling passage 202 positioned adjacent forward end 156 may flow through the plurality of forward exhaust holes 224, and may subsequently be exhausted adjacent forward end 156 of seal portion 154, and into the hot gas flow path of combustion gases 26 flowing through turbine 28 (see, FIG. 2). Additionally, cooling fluid flowed to a portion of cooling passage 202 positioned adjacent aft end 158 of seal portion 154 may flow through plurality of aft exhaust holes 232, exhaust adjacent aft end 158, and finally flow into the hot gas flow path of combustion gases 26 flowing through turbine 28 (see, FIG. 2).

Figure 10:
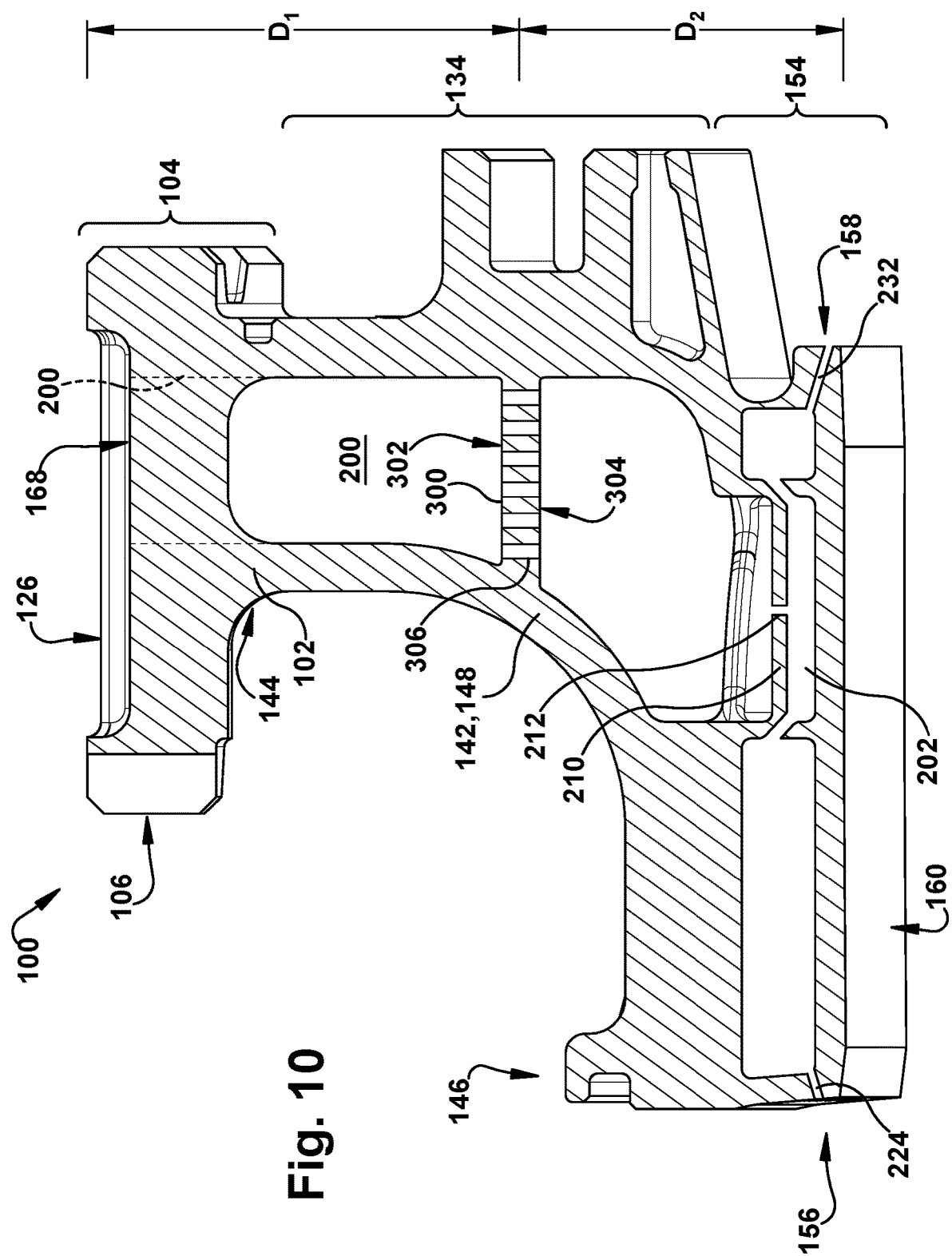
FIG. 10 a side cross-sectional view of the turbine shroud of FIG. 7 taken along line CS1-CS1, according to additional embodiments of the disclosure.
Figure 11:
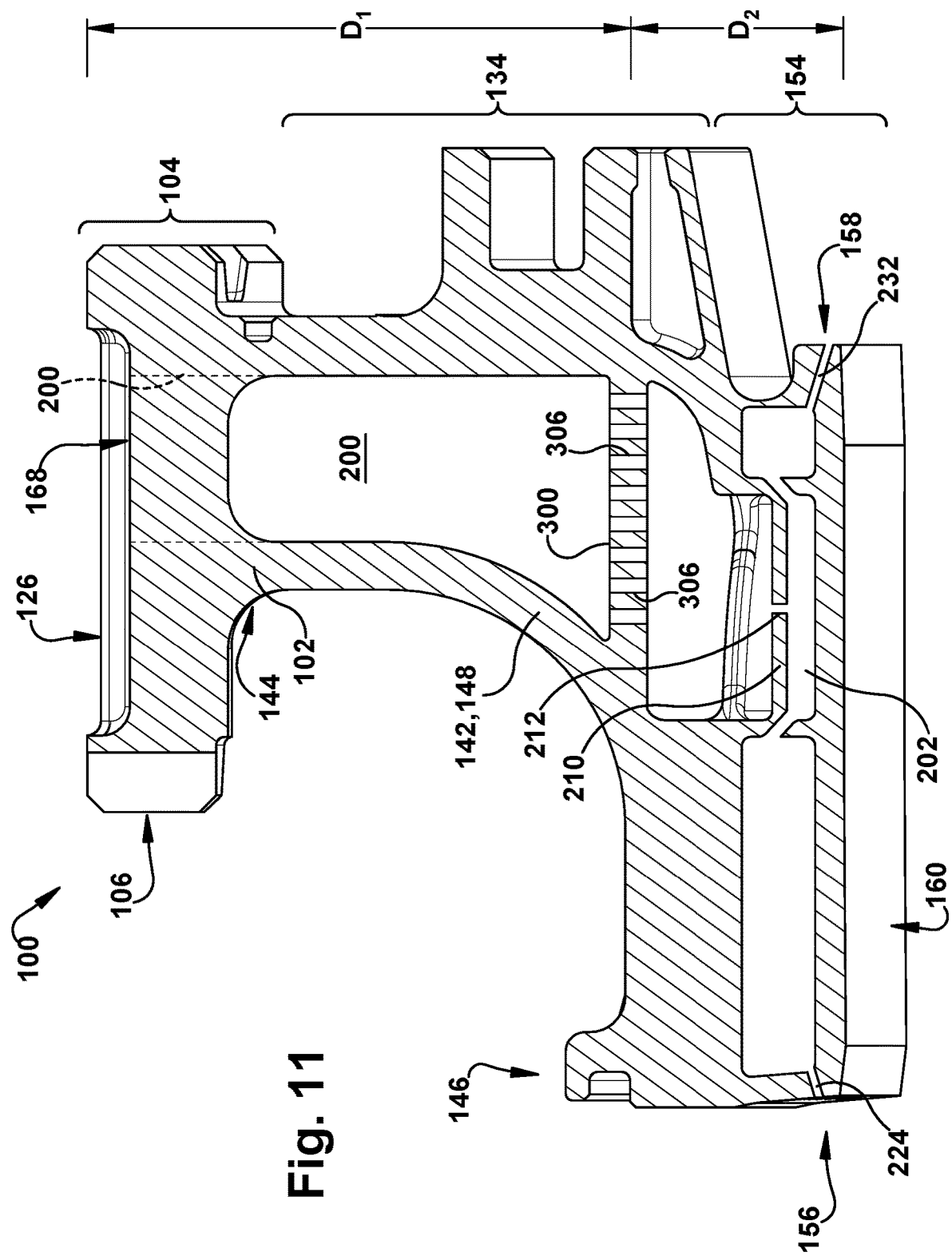
FIG. 11 a side cross-sectional view of the turbine shroud of FIG. 7 taken along line CS1-CS1, according to further embodiments of the disclosure.

FIGS. 10 and 11 show additional non-limiting examples of turbine shroud 100 including unitary body 102. More specifically, both FIGS. 10 and 11 show side cross-sectional views of turbine shroud 100 similar to the non-limiting example shown in FIG. 8. It is understood that similarly numbered and/or named components may function in a substantially similar fashion. Overlapping explanation of these components has been omitted for clarity.

As discussed herein, shot peen screen 300 formed integrally within plenum 200 of unitary body 102 may be spaced from inlet opening 168 formed in support portion 104 a first distance ($D_1$), and may be spaced from cooling passage 202 formed in seal portion 154 a second distance ($D_2$). In the non-limiting example shown in FIG. 10, first distance ($D_1$) and second distance ($D_2$) may be substantially equal or the same. As such, shot peen screen 300 may be positioned equidistant from inlet opening 168 formed in support portion 104 and cooling passage 202 formed in seal portion 154.

Distinct from the non-limiting examples shown in FIGS. 8 and 10, second distance ($D_2$) between shot peen screen 300 and cooling passage 202, as shown in FIG. 11, may be less than the first distance ($D_1$) between shot peen screen 300 and inlet opening 168. As such, shot peen screen 300 may be positioned radially closer to cooling passage 202 formed in seal portion 154 than inlet opening 168 formed in support portion 102.

Figure 12:
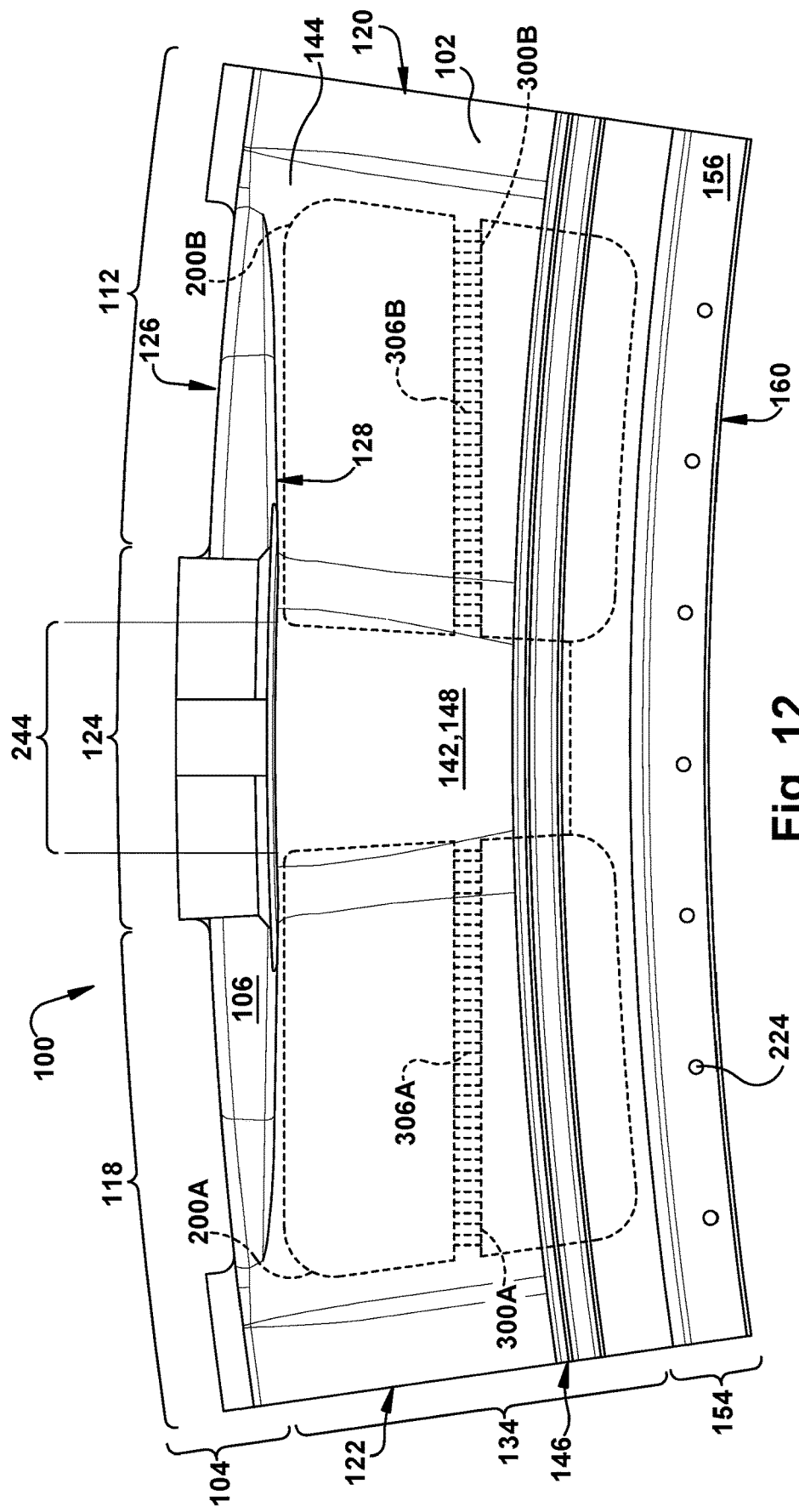
FIG. 12 shows a front view of the turbine shroud of FIG. 3, according to further embodiments of the disclosure.

FIG. 12 shows another non-limiting example of turbine shroud 100. Specifically, FIG. 12 shows a front view of turbine shroud 100, similar to the front view of FIG. 4. It is understood that similarly numbered and/or named components may function in a substantially similar fashion. Overlapping explanation of these components has been omitted for clarity.

As shown in FIG. 12, unitary body 102 of turbine shroud 100 may include a plurality of plenums 200A, 200B (shown in phantom). In the non-limiting example, turbine shroud 100 may include two distinct plenums 200A, 200B formed therein, and separated by a wall 244. Both plenums 200A, 200B may extend (radially) through at least a portion of support portion 104, intermediate portion 134, and seal portion 154 of unitary body 102. First plenum 200A may also extend and/or be formed circumferentially between wall 244 and first slash face 120, and second plenum 200B may extend and/or be formed circumferentially between wall 244 and second slash face 122. Additionally, first plenum 200A may be in be fluidly coupled to and/or in direct fluid communication with inlet opening 168A formed in support portion 104, and second plenum 200B may be in be fluidly coupled to and/or in direct fluid communication with inlet opening 168B formed in support portion 104. Similar to plenum 200 discussed herein with respect to FIGS. 8 and 9, first plenum 200A and second plenum 200B may each be in fluid communication with and/or fluidly coupled to cooling passage 202 via the plurality of impingement openings 212 formed through rib 210 (see e.g., FIG. 8). During operation of turbine system 10 (see, FIG. 1), the cooling fluid provided to first plenum 200A, and the separate cooling fluid provided to second plenum 200B may all flow to and/or combine within cooling passage 202.

Additionally as shown in the non-limiting example, unitary body 102 of turbine shroud 100 may include a plurality of shot peen screens 300A, 300B. That is, where turbine shroud 100 includes a plurality of distinct plenums 200A, 200B, unitary body 102 of turbine shroud 100 may also include a plurality of distinct shot peen screens 300A, 300B formed therein. As shown in FIG. 12, first shot peen screen 300A may be positioned within first plenum 200A and may extend within intermediate portion 134 of unitary body 102. First shot peen screen 300A may extend between first slash face 120 of opposing slash faces 120, 122 of unitary body 102 and wall 244 separating first plenum 200A from second plenum 200B. Similar to shot peen screen 300 discussed herein with respect to FIGS. 8 and 9, first shot peen screen 300A may be formed integral with and may extend axially between aft segment 136 of intermediate portion 134 and non-linear segment 142 of intermediate portion 134, within first plenum 200A. Additionally, first shot peen screen 300A may be positioned within first plenum 200A, radially between inlet opening 168A formed in support portion 104 and cooling passage 202 formed in seal portion 154.

Similar to first shot peen screen 300A, second shot peen screen 300B may be positioned within second plenum 200B. More specifically, second shot peen screen 300B may be positioned within second plenum 200B and may extend within intermediate portion 134 of unitary body 102. Second shot peen screen 300B may extend between second slash face 122 of opposing slash faces 120, 122 of unitary body 102 and wall 244. Second shot peen screen 300B may also be formed integral with and may extend axially between aft segment 136 of intermediate portion 134 and non-linear segment 142 of intermediate portion 134, within second plenum 200B. Furthermore, second shot peen screen 300B may be positioned within second plenum 200B, radially between inlet opening 168B formed in support portion 104 and cooling passage 202 formed in seal portion 154.

Turbine shroud 100 may be formed in a number of ways. In one embodiment, turbine shroud 100 may be made by casting. However, as noted herein, additive manufacturing is particularly suited for manufacturing turbine shroud 100 including unitary body 102. As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of plastic or metal, much of which is cut away and discarded, the only material used in additive manufacturing is what is required to shape the part. Additive manufacturing processes may include but are not limited to: 3D printing, rapid prototyping (RP), direct digital manufacturing (DDM), binder jetting, selective laser melting (SLM) and direct metal laser melting (DMLM). In the current setting, DMLM or SLM have been found advantageous.

Figure 13:
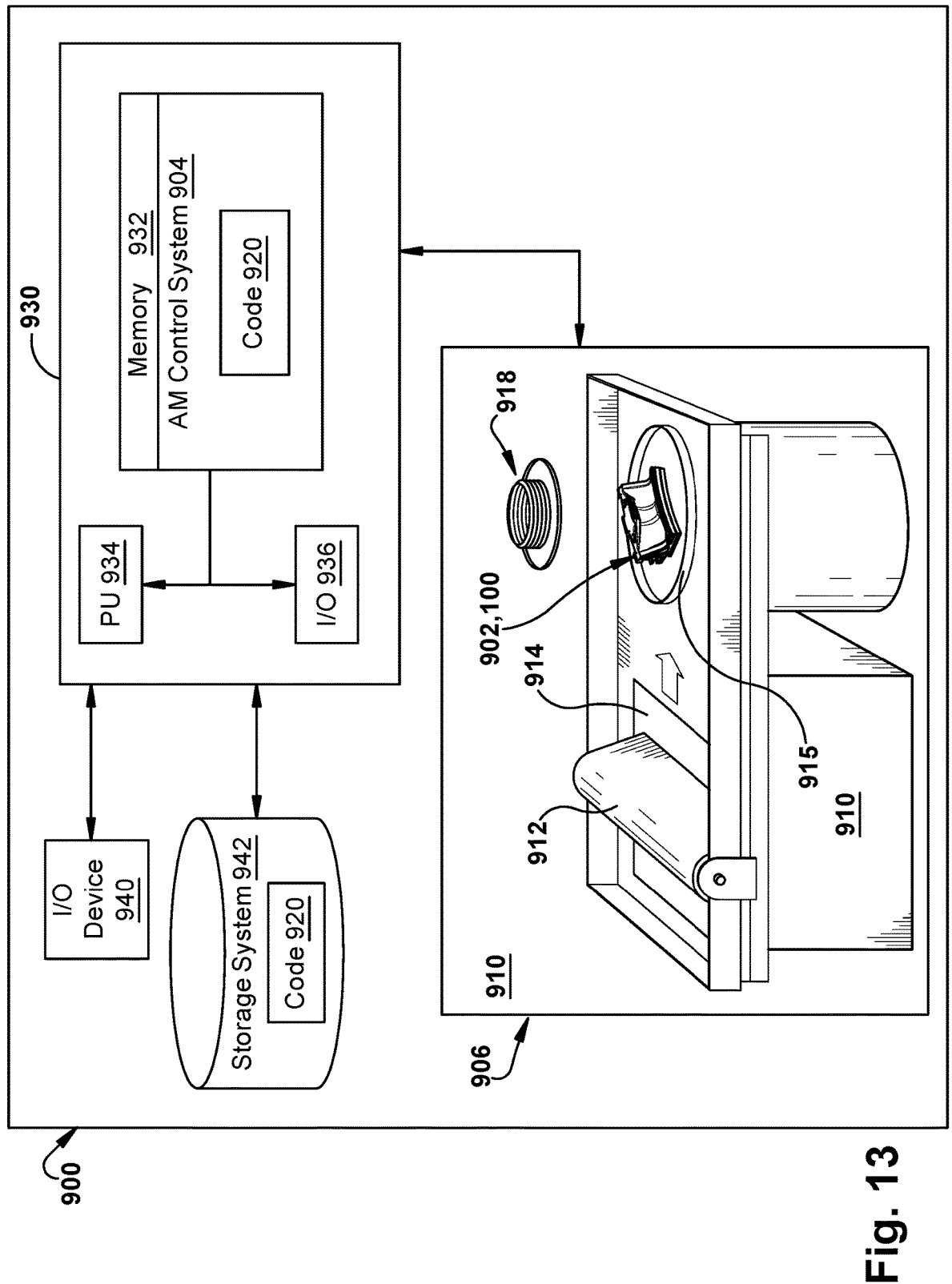
FIG. 13 shows a block diagram of an additive manufacturing process including a non-transitory computer readable storage medium storing code representative of a turbine shroud according to embodiments of the disclosure.

To illustrate an example of an additive manufacturing process, FIG. 13 shows a schematic/block view of an illustrative computerized additive manufacturing system 900 for generating an object 902. In this example, system 900 is arranged for DMLM. It is understood that the general teachings of the disclosure are equally applicable to other forms of additive manufacturing. Object 902 is illustrated as turbine shroud 100 (see, FIGS. 2-12). AM system 900 generally includes a computerized additive manufacturing (AM) control system 904 and an AM printer 906. AM system 900, as will be described, executes code 920 that includes a set of computer-executable instructions defining turbine shroud 100 to physically generate the object 902 using AM printer 906. Each AM process may use different raw materials in the form of, for example, fine-grain powder, liquid (e.g., polymers), sheet, etc., a stock of which may be held in a chamber 910 of AM printer 906. In the instant case, turbine shroud 100 may be made of a metal or metal compound capable of withstanding the environment of gas turbine system 10 (see, FIG. 1). As illustrated, an applicator 912 may create a thin layer of raw material 914 spread out as the blank canvas on a build plate 915 of AM printer 906 from which each successive slice of the final object will be created. In other cases, applicator 912 may directly apply or print the next layer onto a previous layer as defined by code 920, e.g., where a metal binder jetting process is used. In the example shown, a laser or electron beam 916 fuses particles for each slice, as defined by code 920, but this may not be necessary where a quick setting liquid plastic/polymer is employed. Various parts of AM printer 906 may move to accommodate the addition of each new layer, e.g., a build platform 918 may lower and/or chamber 910 and/or applicator 912 may rise after each layer.

AM control system 904 is shown implemented on computer 930 as computer program code. To this extent, computer 930 is shown including a memory 932, a processor 934, an input/output (I/O) interface 936, and a bus 938. Further, computer 930 is shown in communication with an external I/O device/resource 940 and a storage system 942. In general, processor 934 executes computer program code, such as AM control system 904, that is stored in memory 932 and/or storage system 942 under instructions from code 920 representative of turbine shroud 100, described herein. While executing computer program code, processor 934 can read and/or write data to/from memory 932, storage system 942, I/O device 940 and/or AM printer 906. Bus 938 provides a communication link between each of the components in computer 930, and I/O device 940 can comprise any device that enables a user to interact with computer 940 (e.g., keyboard, pointing device, display, etc.). Computer 930 is only representative of various possible combinations of hardware and software. For example, processor 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 932, storage system 942, etc.) storing code 920 representative of turbine shroud 100. As noted, code 920 includes a set of computer-executable instructions defining outer electrode that can be used to physically generate the tip, upon execution of the code by system 900. For example, code 920 may include a precisely defined 3D model of turbine shroud 100 and can be generated from any of a large variety of well-known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 920 may be translated between different formats, converted into a set of data signals and transmitted, received as a set of data signals and converted to code, stored, etc., as necessary. Code 920 may be an input to system 900 and may come from a part designer, an intellectual property (IP) provider, a design company, the operator or owner of system 900, or from other sources. In any event, AM control system 904 executes code 920, dividing turbine shroud 100 into a series of thin slices that it assembles using AM printer 906 in successive layers of liquid, powder, sheet or other material. In the DMLM example, each layer is melted to the exact geometry defined by code 920 and fused to the preceding layer. Subsequently, the turbine shroud 100 may be exposed to any variety of finishing processes, e.g., those described herein for re-contouring or other minor machining, sealing, polishing, shot peening, etc.

Technical effects of the disclosure include, e.g., providing a turbine shroud formed from a unitary body that includes at least one shot peen screen formed integrally therein. The integrally formed shot peen screen may prevent shot from passing through the shot peen screen when performing a shot peening process on the unitary body of the turbine shroud. The integrally formed shot peen screen may reduce or eliminate the shot from undesirably contacting, and/or becoming embedded with, and ultimately obstructing impingement openings and/or cooling passages also integrally formed within the turbine shroud.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A turbine shroud for a turbine system, the turbine shroud comprising:
    a unitary body including:
        a support portion coupled directly to a turbine casing of the turbine system;
        an intermediate portion integral with and extending away from the support portion;
        a seal portion integral with the intermediate portion and opposite the support portion, the seal portion including a forward end, an aft end positioned opposite the forward end, and a hot gas path (HGP) surface extending between the forward end and the aft end;
        at least one inlet opening formed in the support portion;
        at least one plenum in fluid communication with the at least one inlet opening, the at least one plenum extending through the support portion and the intermediate portion;
        a cooling passage extending through the seal portion, between the forward end and the aft end of the seal portion, the cooling passage positioned between the at least one plenum and the HGP surface of the seal portion,
        wherein the cooling passage is in fluid communication with the at least one plenum; and
        at least one shot peen screen positioned within the at least one plenum and extending within the intermediate portion, the at least one shot peen screen including a plurality of voids formed therethrough,
        wherein the at least one shot peen screen prevents shot from passing through the at least one shot peen screen when performing a shot peening process on the unitary body.

2. The turbine shroud of claim 1, wherein the at least one shot peen screen is positioned between the at least one inlet opening formed in the support portion and the cooling passage.

3. The turbine shroud of claim 2, wherein the at least one shot peen screen is one of:
    positioned equidistant from the at least one inlet opening formed in the support portion and the cooling passage,
    positioned radially closer to the at least one inlet opening than the cooling passage, or
    positioned radially closer to the cooling passage than the at least one inlet opening.

4. The turbine shroud of claim 1, wherein the unitary body includes two opposing slash faces extending adjacent to and between the support portion and the seal portion, the two opposing slash faces positioned opposite one another, and
    wherein the at least one shot peen screen extends between the two opposing slash faces.

5. The turbine shroud of claim 4, wherein the intermediate portion of the unitary body further includes:
    an aft segment extending between the support portion and the seal portion, adjacent the at least one plenum, the aft segment extending between the two opposing slash faces; and
    a non-linear segment extending between the support portion and the seal portion, adjacent the at least one plenum and axial opposite the aft segment, the non-linear segment extending between the two opposing slash faces.

6. The turbine shroud of claim 5, wherein the at least one shot peen screen is formed integral with and extends between the aft segment of the intermediate portion and the non-linear segment of the intermediate portion within the at least one plenum.

7. The turbine shroud of claim 4, wherein the at least one plenum further includes:
   a first plenum extending through the support portion and the intermediate portion, adjacent a first slash face of the two opposing slash faces; and
   a second plenum extending through the support portion and the intermediate portion, adjacent a second slash face of the two opposing slash faces, the second plenum separated from the first plenum by a wall extending between the support portion and the seal portion.

8. The turbine shroud of claim 7, wherein the at least one shot peen screen further includes:
   a first shot peen screen positioned within the first plenum and extending within the intermediate portion, the first shot peen screen extending between the first slash face of the two opposing slash faces and the wall; and
   a second shot peen screen positioned within the second plenum and extending within the intermediate portion, the second shot peen screen extending between the second slash face of the two opposing slash faces and the wall.

9. The turbine shroud of claim 1, wherein the unitary body further includes:
   a rib formed in the seal portion, the rib positioned between and separating the at least one plenum and the cooling passage; and
   a plurality of impingement openings formed through the rib to fluidly couple the cooling passage to the at least one plenum.

10. The turbine shroud of claim 9, wherein a dimension of each of the plurality of the voids for the at least one shot peen screen is larger than a dimension of each of the plurality of impingement openings formed through the rib.

11. A turbine system comprising:
   a turbine casing;
   a rotor extending axially through the turbine casing;
   a plurality of turbine blades positioned circumferentially about and extending radially from the rotor; and
   a plurality of turbine shrouds directly coupled to the turbine casing and positioned radially between the turbine casing and a tip portion of the plurality of turbine blades, each of the plurality of turbine shrouds including:
      a unitary body including:
         a support portion coupled directly to a turbine casing of the turbine system;
         an intermediate portion integral with and extending away from the support portion;
         a seal portion integral with the intermediate portion and opposite the support portion, the seal portion including a forward end, an aft end positioned opposite the forward end, and a hot gas path (HGP) surface extending between the forward end and the aft end;
         at least one inlet opening formed in the support portion;
         at least one plenum in fluid communication with the at least one inlet opening, the at least one plenum extending through the support portion and the intermediate portion;
         a cooling passage extending through the seal portion, between the forward end and the aft end of the seal portion, the cooling passage positioned between the at least one plenum and the HGP surface of the seal portion,
      wherein the cooling passage is in fluid communication with the at least one plenum; and
      at least one shot peen screen positioned within the at least one plenum and extending within the intermediate portion, the at least one shot peen screen including a plurality of voids formed therethrough,
      wherein the at least one shot peen screen prevents shot from passing through the at least one shot peen screen when performing a shot peening process on the unitary body.

12. The turbine system of claim 11, wherein the at least one shot peen screen of the unitary body for each of the plurality of turbine shrouds is positioned between the at least one inlet opening formed in the support portion and the cooling passage.

13. The turbine system of claim 12, wherein the at least one shot peen screen of the unitary body for each of the plurality of turbine shrouds is one of:
   positioned equidistant from the at least one inlet opening formed in the support portion and the cooling passage,
   positioned radially closer to the at least one inlet opening than the cooling passage, or
   positioned radially closer to the cooling passage than the at least one inlet opening.

14. The turbine system of claim 11, wherein the unitary body for each of the plurality of turbine shrouds includes two opposing slash faces extending adjacent to and between the support portion and the seal portion, the two opposing slash faces positioned opposite one another, and
   wherein the at least one shot peen screen extends between the two opposing slash faces.

15. The turbine system of claim 14, wherein the intermediate portion of the unitary body for each of the plurality of turbine shrouds further includes:
   an aft segment extending between the support portion and the seal portion, adjacent the at least one plenum, the aft segment extending between the two opposing slash faces; and
   a non-linear segment extending between the support portion and the seal portion, adjacent the at least one plenum and axial opposite the aft segment, the non-linear segment extending between the two opposing slash faces.

16. The turbine system of claim 15, wherein the at least one shot peen screen of the unitary body for each of the plurality of turbine shrouds is formed integral with and extends between the aft segment of the intermediate portion and the non-linear segment of the intermediate portion within the at least one plenum.

17. The turbine system of claim 14, wherein the at least one plenum of the unitary body for each of the plurality of turbine shrouds further includes:
   a first plenum extending through the support portion and the intermediate portion, adjacent a first slash face of the two opposing slash faces; and
   a second plenum extending through the support portion and the intermediate portion, adjacent a second slash face of the two opposing slash faces, the second plenum separated from the first plenum by a wall extending between the support portion and the seal portion.

18. The turbine system of claim 17, wherein the at least one shot peen screen of the unitary body for each of the plurality of turbine shrouds further includes:

a first shot peen screen positioned within the first plenum and extending within the intermediate portion, the first shot peen screen extending between the first slash face of the two opposing slash faces and the wall; and a second shot peen screen positioned within the second plenum and extending within the intermediate portion, the second shot peen screen extending between the second slash face of the two opposing slash faces and the wall.

19. The turbine system of claim 11, wherein the unitary body for each of the plurality of turbine shrouds further includes:

a rib formed in the seal portion, the rib positioned between and separating the at least one plenum and the cooling passage; and a plurality of impingement openings formed through the rib to fluidly couple the cooling passage to the at least one plenum.

20. The turbine system of claim 19, wherein a dimension of each of the plurality of the voids for the at least one shot peen screen is larger than a dimension of each of the plurality of impingement openings formed through the rib.

* * * * *